US012678975B2

(12) United States Patent
Brown et al.

(10) Patent No.: US 12,678,975 B2
(45) Date of Patent: Jul. 14, 2026

(54) ROBOTIC END EFFECTOR SYSTEM

(71) Applicant: Chef Robotics, Inc., San Francisco, CA (US)

(72) Inventors: Kody Brown, San Francisco, CA (US); Xinyi Daniel Tang, San Francisco, CA (US); Weston Wahl, San Francisco, CA (US); Clement Creusot, San Francisco, CA (US); Rajat Bhageria, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 945 days.

(21) Appl. No.: 17/965,202

(22) Filed: Oct. 13, 2022

(65) Prior Publication Data

US 2023/0123516 A1 Apr. 20, 2023

Related U.S. Application Data

(60) Provisional application No. 63/337,497, filed on May 2, 2022, provisional application No. 63/304,449, filed (Continued)

(51) Int. Cl.
*B25J 15/00* (2006.01)
*B25J 11/00* (2006.01)

(52) U.S. Cl.
CPC ....... *B25J 15/0028* (2013.01); *B25J 11/0045* (2013.01)

(58) Field of Classification Search
CPC .. B25J 15/022; B25J 15/0028; B25J 15/0475; B25J 11/0045
See application file for complete search history.

(56) References Cited

U.S. PATENT DOCUMENTS

D547,643 S 7/2007 Ratajczek et al.
D553,655 S 10/2007 Jennings et al.
(Continued)

FOREIGN PATENT DOCUMENTS

KR 102599468 B1 11/2023

OTHER PUBLICATIONS

"EMI Engineers are here to assist you with all aspects of your part handling EOAT", EMI, EOAT Solutions, EOAT Engineering, https://www.emicorp.com/eoat-engineering, first downloaded 23-Jan. 2025.
(Continued)

*Primary Examiner* — Sang K Kim
(74) *Attorney, Agent, or Firm* — Jeffrey Schox; Evan Myers

(57) ABSTRACT

An end effector system can include: an optional actuator; an optional utensil mating connector; and a utensil. The utensil can include: a set of scoops; a set of mechanical linkages; a set of ingressive elements; and/or any other suitable components. However, the end effector system can additionally or alternatively include any other suitable set of components. The end effector system functions to facilitate picking of ingredients (e.g., foodstuffs), ingredient transformation, and/or ingredient insertion (e.g., at a target foodstuff container and/or placement location) via a grasp cavity of the utensil. Additionally or alternatively, the end effector system can function to shape a profile of ingredients (e.g., upon insertion). Additionally or alternatively, the end effector system can function to evacuate ingredients from the grasp cavity (e.g., clearing out ingredients adhering to the utensil).

20 Claims, 36 Drawing Sheets

Related U.S. Application Data on Jan. 28, 2022, provisional application No. 63/255,875, filed on Oct. 14, 2021, provisional application No. 63/255,869, filed on Oct. 14, 2021.

(56) References Cited

U.S. PATENT DOCUMENTS

| | | | |
|---|---|---|---|
| D651,626 | S | 1/2012 | Koike et al. |
| D785,688 | S | 5/2017 | Matsuda |
| D876,191 | S | 2/2020 | Orikawa |
| D900,182 | S | 10/2020 | Haddadin et al. |
| D924,295 | S | 7/2021 | Son et al. |
| D958,859 | S | 7/2022 | Picard et al. |
| D985,692 | S | 5/2023 | Clemmer |
| 2012/0043777 | A1 | 2/2012 | Maffeis |
| 2020/0054175 | A1 | 2/2020 | Roy et al. |
| 2020/0101617 | A1 | 4/2020 | Koike et al. |
| 2021/0400993 | A1 | 12/2021 | Hare |
| 2022/0331974 | A1* | 10/2022 | Lovedale ................ A23P 20/20 |
| 2022/0346598 | A1 | 11/2022 | Sinnet et al. |
| 2023/0039524 | A1 | 2/2023 | Bhageria et al. |
| 2023/0159285 | A1 | 5/2023 | Catelli et al. |
| 2023/0347525 | A1 | 11/2023 | Bhageria et al. |
| 2023/0390941 | A1 | 12/2023 | Opoku et al. |
| 2024/0198540 | A1* | 6/2024 | Huang ................. B25J 15/0475 |
| 2025/0326591 | A1* | 10/2025 | Unkovic ................ B25J 9/0093 |

OTHER PUBLICATIONS

Unkovic, et al., "Container Classification System and/or Method", U.S. Appl. No. 19/056,565, filed Feb. 18, 2025.

Unkovic, et al., "Robotic End Effector System for Multiple Deposits", U.S. Appl. No. 19/186,481, filed Apr. 22, 2025.

Bhageria, Rajat , et al., "Foodstuff Utensil", U.S. Appl. No. 29/855,432, filed Oct. 3, 2022.

"Chef Robotics Fully Automated Line Youtube", posted Jul. 11, 2024 [online], [retrieved Oct. 11, 2024]. Retrieved from internet, https://youtube.com/watch?v=S9r-vHW_xng (Year: 2024).

"Chef Robotics Homepage", posted date unknown [online], [retrieved Oct. 11, 2024]. Retrieved from internet, https://www.chefrobotics. ai/.

"Chef Robotics Marinara Sauce", posted Jul. 11, 2024 [online], [retrieved Oct. 11, 2024]. Retrieved from internet, https://www.youtube.com/watch?v=rmt6UcVyxfM (Year: 2024).

"End Effector Animation", posted Jul. 11, 2024 [online], [retrieved Oct. 11, 2024]. Retrieved from internet, https://www.youtube.com/watch?v=Ox_tJj7IT8E&list=PLQRM4UQvc8BU-XerAanKp3-ffORJPGInV&index=4 (Year: 2024).

* cited by examiner utensil 200 actuation input 112 mechanical linkage 220 ingressive element 230 linkage pivot 220

Ingressive element transformation scoop transformation grasp cavity 202 scoop 210 utensil 200 actuation input 112 set of mechanical linkages
220 (e.g., scissor linkages)

shaping surface 208 ingressive element 230 grasp cavity 202 scoop 210 utensil transformation utensil 200 actuation input set of mechanical linkages
220 (e.g., parallelogram; pivot)

scoop 210 grasp cavity 202 ingressive element
230 shaping surface 208 scoop transformation
(e.g., grasp cavity transformation)

utensil 200 utensil 200 utensil 200 utensil 200

120

110 retention pin

120 dovetail joint utensil
extender utensil
extender

200 scoop

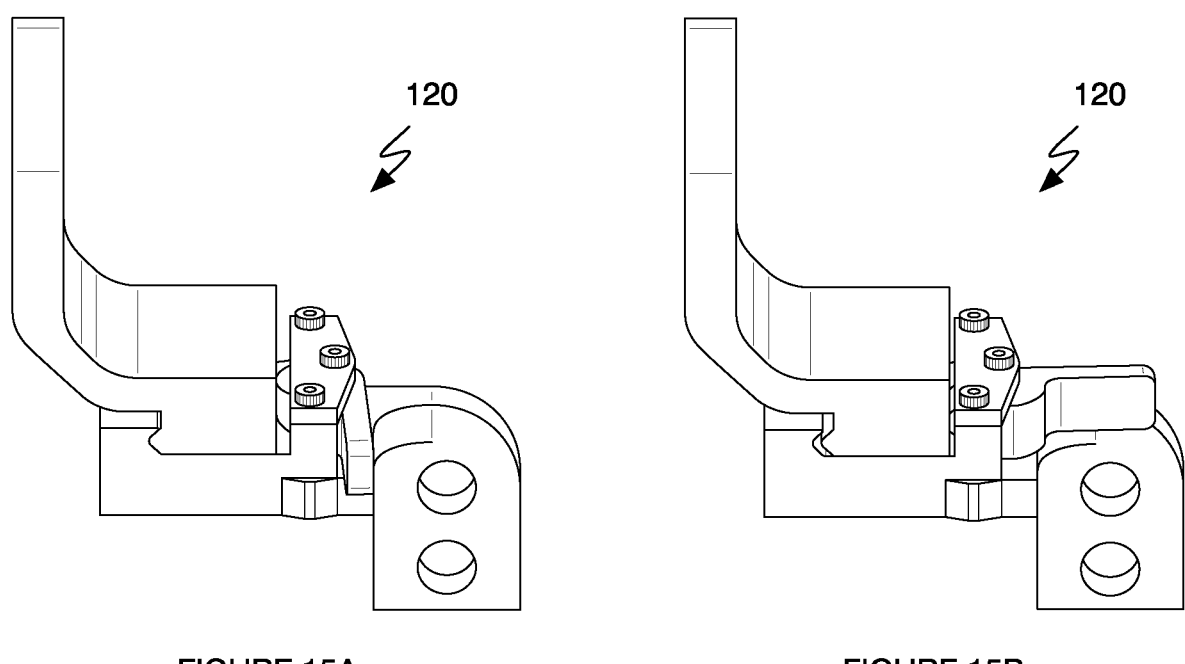
FIGURE 15A
FIGURE 15B
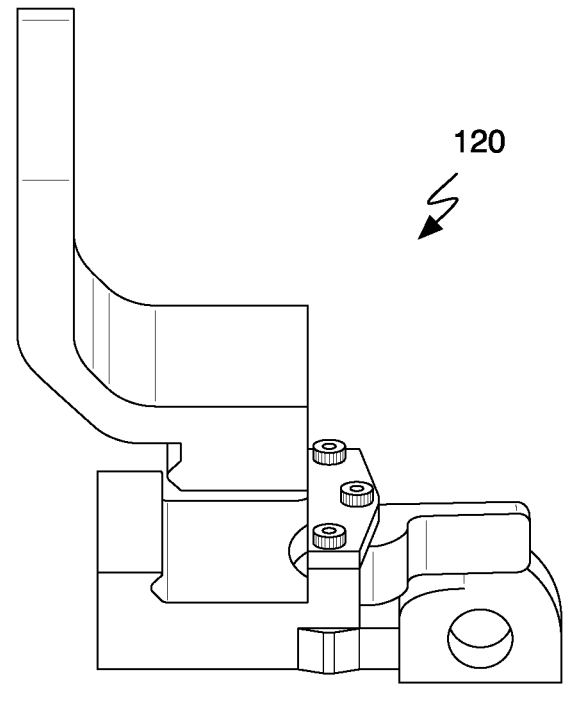
FIGURE 15C

120 thru hole (e.g.,
for retention pin)

tapered dovetail
channel installation
indicator
(directionality)

tapered dovetail
extrusion utensil 200 ingressive element 230 scoop 210

200 assembly indicator

120

210

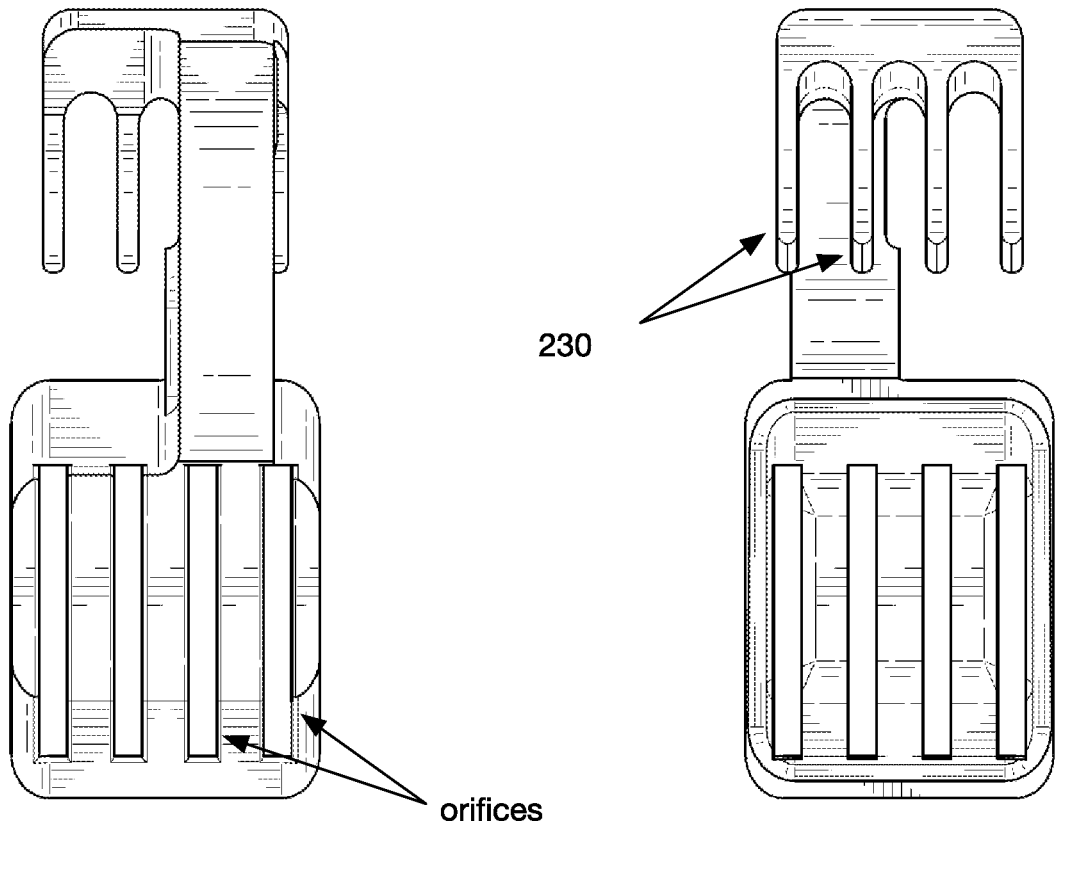
230
orifices
FIGURE 22C                    FIGURE 22D

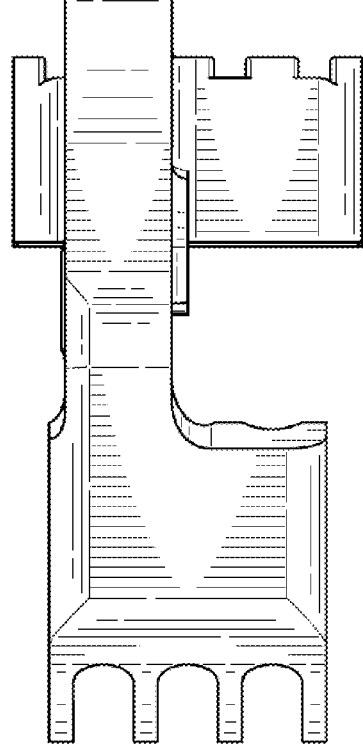
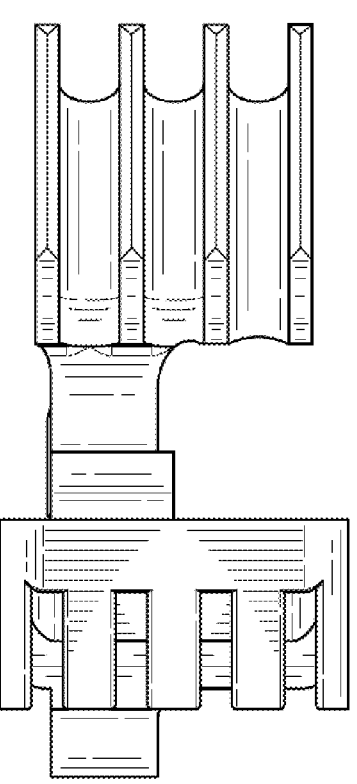
FIGURE 22E                              FIGURE 22F buldge (eliminate finger-gap)

tapered dovetail feature
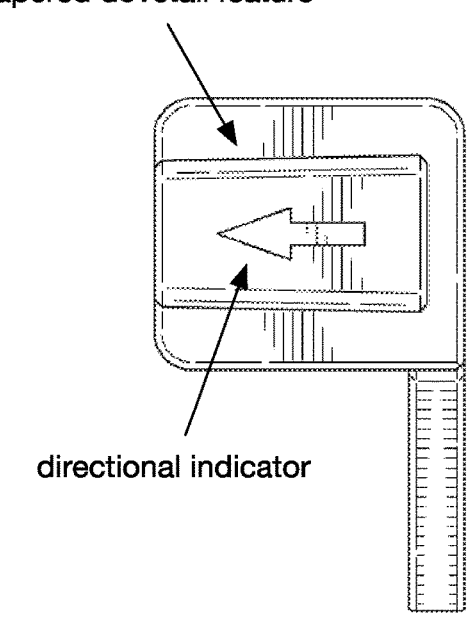
directional indicator
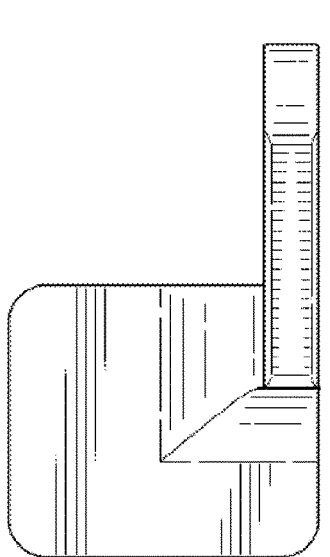
FIGURE 23C                               FIGURE 23D wrist clearance extension element actuation input 112 set of mechanical
linkages 220 set of mechanical
linkages 220 actuation input 112 utensil 200 utensil 200 utensil 200 set of
ingressive
elements first
ingressive
element set of
apertures first respective
aperture of the set of
apertures (e.g.,
aligned with the first
ingressive element)

first ingressive
element ingress
through the first
respective aperture apertures utensil mating connectors 120

ROBOTIC END EFFECTOR SYSTEM

CROSS REFERENCE TO RELATED APPLICATIONS

This application claims the benefit of U.S. Provisional Application Ser. No. 63/337,497, filed 2 May 2022, U.S. Provisional Application Ser. No. 63/304,449, filed 28 Jan. 2022, U.S. Provisional Application Ser. No. 63/255,875, filed 14 Oct. 2021, and U.S. Provisional Application Ser. No. 63/255,869, filed 14 Oct. 2021, each of which is incorporated herein in its entirety by this reference.

U.S. Design application Ser. No. 29/855,432, filed 3 Oct. 2022, is incorporated herein in its entirety by this reference.

TECHNICAL FIELD

This invention relates generally to the food industry field, and more specifically to a new and useful robotic end effector system in the food industry field.

BRIEF DESCRIPTION OF THE FIGURES

FIGS. 15A-C are 3D views of an example of a utensil mating connector in a first, second, and third configuration, respectively.

FIG. 22C is an elevation view from the left of the first variant of a scoop, integrated with a set of ingressive elements.

FIG. 22D is an elevation view from the right of the first variant of a scoop, integrated with a set of ingressive elements.

FIG. 22E is a plan view from the top of the first variant of a scoop, integrated with a set of ingressive elements.

FIG. 22F is a plan view from the bottom of the first variant of a scoop, integrated with a set of ingressive elements.

FIGS. 23C-D are plan views, from the top and bottom, respectively, of the first variant of the utensil extender.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
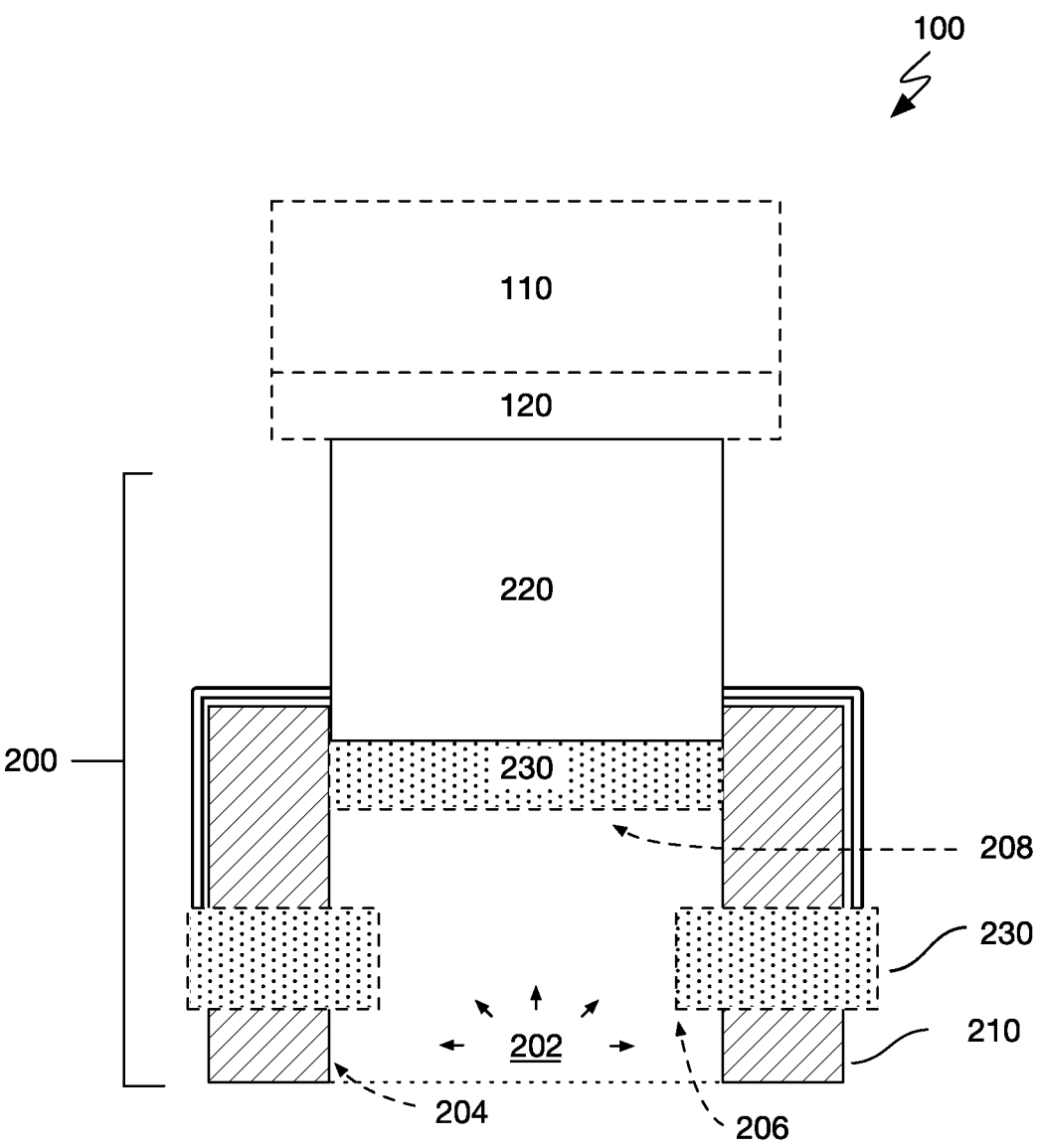
FIG. 1 is a schematic representation of a variant of the end effector system.

The end effector system 100, an example of which is shown in FIG. 1, can include: an optional actuator 110; an optional utensil mating connector 120; and a utensil 200. The utensil can include: a set of scoops 210; a set of mechanical linkages 220; a set of ingressive elements 230; and/or any other suitable components. However, the end effector system 100 can additionally or alternatively include any other suitable set of components. The end effector system functions to facilitate ingredient (e.g., foodstuffs) manipulation, ingredient picking, ingredient transformation, and/or ingredient insertion (e.g., at a target foodstuff container and/or placement location) via a grasp cavity of the utensil. Additionally or alternatively, the end effector system can function to shape a profile of ingredients (e.g., upon insertion). Additionally or alternatively, the end effector system can function to evacuate ingredients from the grasp cavity (e.g., clearing out ingredients adhering to the utensil).

The system can optionally include or be used in conjunction with a robotic assembly system, such as a robotic pick and place system, gantry-style assembly system, multi-axis robotic arm, and/or other robotic assembly system. In variants, the system can be used in conjunction with the robotic assembly system and/or method as described in U.S. application Ser. No. 17/881,475, filed 4 Aug. 2022, which is incorporated herein in its entirety by this reference.

In a first set of variants, system optionally include or be used in conjunction with an industrial conveyor line, or can be deployed in a high-throughput assembly application (e.g., airline food catering prep, etc.), such as in place of a human line worker and a manually-operated utensil. However, the system can alternatively be deployed in any suitable robotic assembly settings. In a second set of variants, the end effector system can be implemented in a restaurant setting, such as a 'fast casual', 'ghost kitchen' or low-throughput application (e.g., without continuous operation; universities, K-12, prisons, hotels, hospitals, factories, stadiums, entertainment venues, festivals, etc.).

Figure 16:
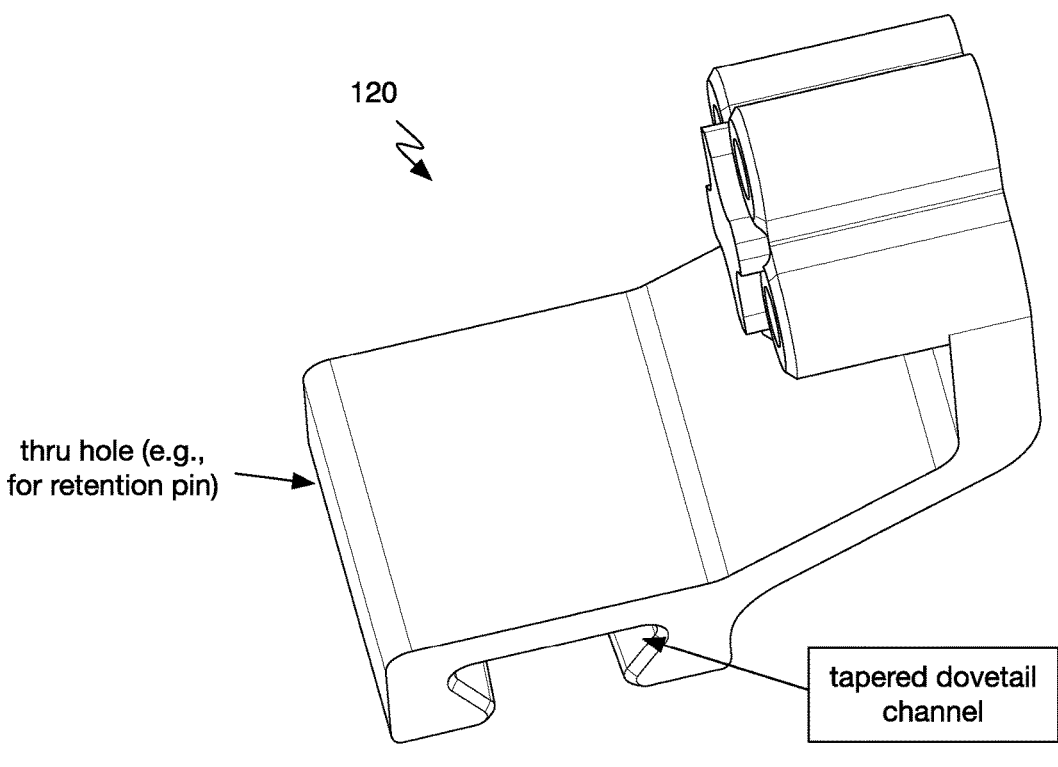
FIG. 16 is a trimetric drawing of an example utensil mating connector with a tapered dovetail channel.
Figure 17:
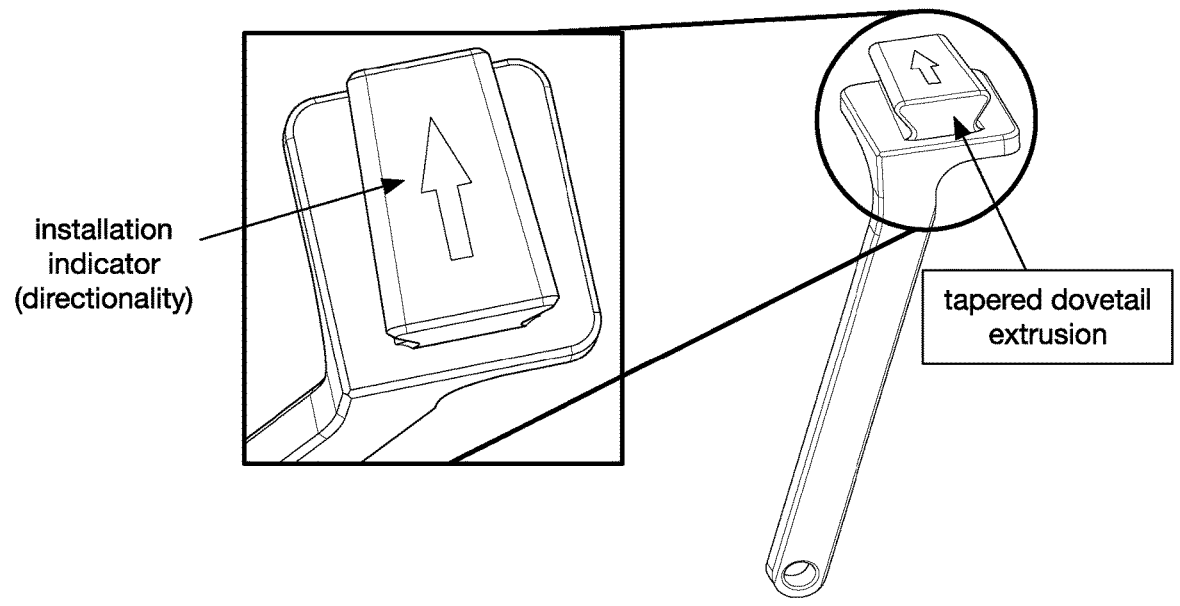
FIG. 17 is a 3D view of an example utensil mating connector with a tapered dovetail extrusion.

In some variants (e.g., such as in the example shown in FIG. 18A), utensils can be connected with a utensil mating connector which includes a dovetail joint. In variants (e.g., such as in the examples shown in FIG. 16 and FIG. 17) the utensil mating connector can include a tapered (sliding) dovetail joint. In variants (e.g., such as in the example shown in FIG. 18B), the end effector system can include closeouts and/or clearances to eliminate pinch points around the utensil, utensil mating connector actuator, and/or any linkages thereof. In some variants, the utensils and/or utensil mating connector can include human identifiable indicators (e.g., indicating assembly directionality; indicating compatibility; indicating size, etc.; such as in the example shown in FIG. 17).

The term "substantially" as utilized herein can mean: exactly, approximately, within a predetermined threshold or tolerance, and/or have any other suitable meaning.

The term "color distance" as utilized herein can refer to the color distance D which is calculated in terms of RGB values by the equation $D^2=R^2+G^2+B^2$ or, similarly, $D=\sqrt{R^2+G^2+B^2}$, where R, G, and B respectively refer to the differences in red, green, and blue values of two colors. For example, the color distance between a first color with RGB values R1, G2, and B1 and a second color with RGB values R2, G2, and B2, the color distance between the first and second colors can be calculated as: $D=\sqrt{(R2-R1)^2+(G2-G1)^2+(B2-B1)^2}$. However, the color distance can be otherwise calculated and/or defined. Likewise, a "minimum color distance" can be understood to mean a minimum value for the color distance/separation between two colors or color ranges. However, the minimum color distance can be otherwise defined.

1.1 ILLUSTRATIVE EXAMPLES

In one set of variants, a robotic end effector system for aggregate manipulation of foodstuff can include: an actuator configured to mount to a distal end of a robotic arm; and a foodstuff utensil mounted to the actuator, which includes: a plurality of scoops, each including a respective grasp cavity and a defining set of apertures; a set of mechanical linkages coupling the plurality of scoops to the actuator and configured to transition the plurality of scoops between a grasp configuration and an anti-grasp configuration based on a mechanical actuation input from the actuator, wherein, in the grasp configuration, the plurality of scoops cooperatively defines a grasp volume within an interior of the respective grasp cavities of the plurality of scoops; and a set of ingressive elements, each ingressive element of the set aligned with a respective aperture, wherein, in the grasp configuration, each ingressive element is outside of the grasp volume, wherein, in the anti-grasp configuration, each of the ingressive elements ingress into the interior of the respective grasp cavity through the aperture.

In a second set of variants, nonexclusive with the first set, a foodstuff utensil which is configured to mount to an actuator of a robot for aggregate manipulation of foodstuff can include: a set of utensil mating connectors; a set of scoops, each including a grasp cavity and a defining set of apertures; a set of ingressive elements, each ingressive element aligned with a respective aperture of a corresponding scoop; a set of mechanical linkages coupling the set of scoops to the set of utensil mating connectors, wherein the set of mechanical linkages is configured to transform the set of scoops between a first and second configuration based on an actuation of the set of utensil mating connectors, wherein, in the first configuration, each ingressive element is outside of an interior grasp volume of each grasp cavity, wherein, in the second configuration, each of the ingressive elements ingress the corresponding scoop through the respective aperture.

2. BENEFITS

Variations of the technology can afford several benefits and/or advantages.

First, variations of this technology can be utilized in a robotic assembly architecture to flexibly adapt to a variety of food assembly applications. Variants of the system can utilize interchangeable food utensils to accommodate different types of ingredients (e.g., with different materials properties, such as different: textures, packing density, shape, compressibility/deformability, etc.; where the utensil form factor may allow for shipping the utensil by mail, such as in a small or medium flat rate USPS box, to facilitate rapid ingredient onboarding) and/or different quantities of ingredients during assembly.

Second, variations of this technology can facilitate placement of sticky (e.g., viscoelastic), malleable, and/or partially frozen ingredients-which have a tendency to cause ingredient buildup on end-effector surfaces after many placement cycles. Variations of this technology can limit ingredient buildup and facilitate continuous operation (e.g., without manual servicing, tool replacement, cleaning, etc.) even after many cycles (e.g., 10, 100, 1 k, 10 k, 20 k, 30 k, 50 k, 100 k, more than 100 k, any range bounded by the aforementioned values, etc.). Limiting ingredient buildup can additionally increase consistency of food assembly (e.g., when compared to a human or a dispensing system) and/or can ensure high accuracy (e.g., mass/volume/quantity within a threshold tolerance, such as within 10% of a predetermined amount) and repeatability (e.g., minimal variability across different robotic arms, particularly when compared to different human users) of placed food amounts, which can provide cost savings (e.g., minimizing excess food provisions; increase yield) and reduce food waste/spillage. In variants, utensils can be passively actuated (e.g., without requiring a communicative connection), which can allow the utensil to be dishwashed or placed into a clean-out-of-place (COP) solution.

Third, variations of this technology can include utensil surfaces which can be used to shape ingredients within a foodstuff container for repeatable placement and/or packing arrangements (e.g., millimeter accuracy, gram mass accuracy, etc.), which can improve aesthetics of assembly and/or conformance to a specific foodstuff arrangement.

Figure 18A:
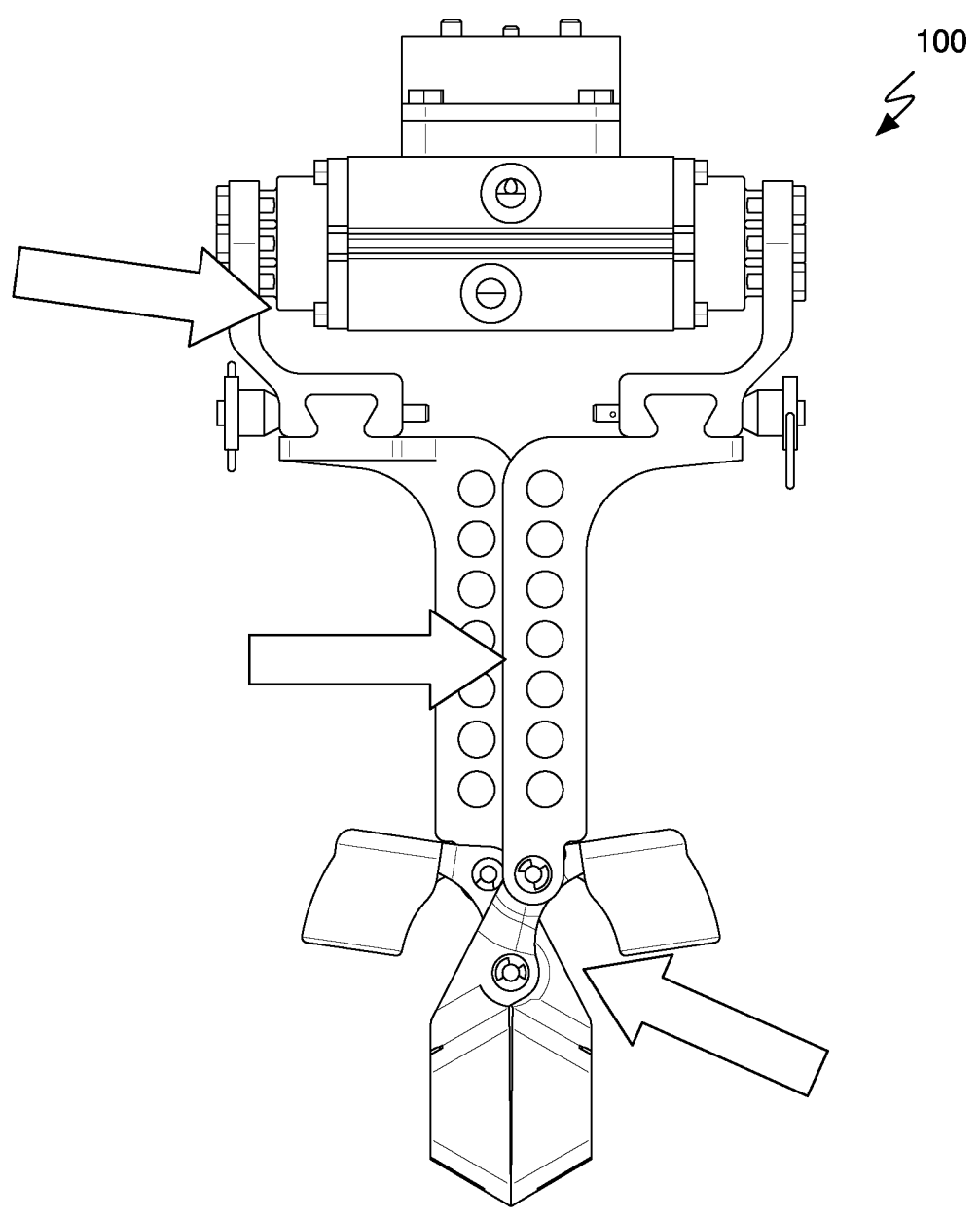
FIGS. 18A-B illustrate a first and a second example of a variant of an end effector, respectively.
Figure 18B:
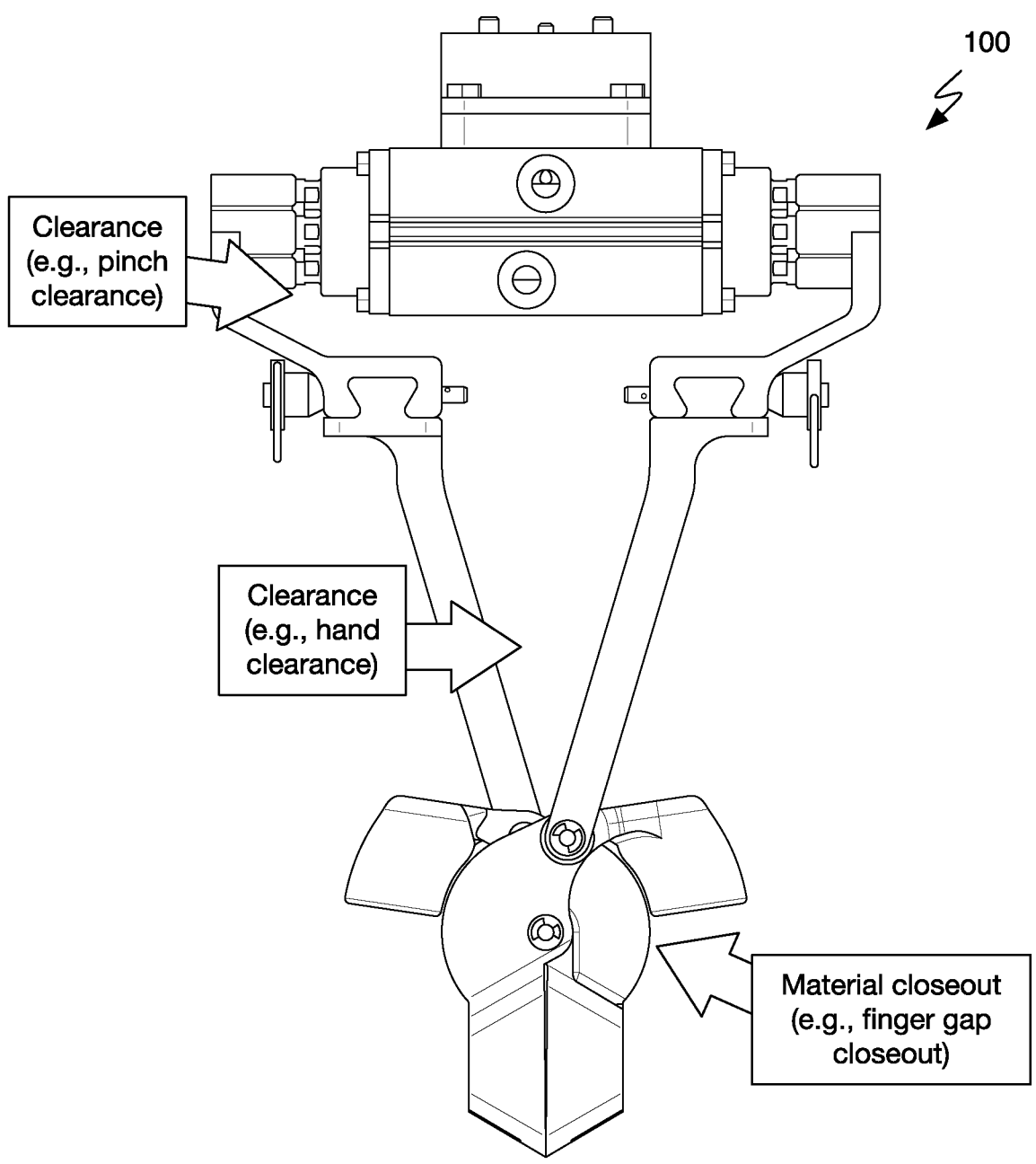

Fourth, variations of this technology can reduce or mitigate user safety risks in a collaborative robotic setting (e.g., where humans may work side by side with the robot and perform various manual servicing operations adjacent to and/or within a task space of the robot). For example, variants can include closeouts, increased material volume, and/or clearance/offsets to reduce or eliminate pinch points (e.g., wrist, finger, etc.; an example is shown in FIGS. 18A-B)

However, variations of the technology can additionally or alternately provide any other suitable benefits and/or advantages.

3. END EFFECTOR SYSTEM

The end effector system 100, an example of which is shown in FIG. 1, can include: an optional actuator 110; an optional utensil mating connector 120; and a utensil 200. The utensil can include: a set of scoops 210; a set of mechanical linkages 220; a set of ingressive elements 230; and/or any other suitable components. However, the end effector system 100 can additionally or alternatively include any other suitable set of components. The end effector system functions to facilitate ingredient (e.g., foodstuffs) manipulation, ingredient picking, ingredient transformation, and/or ingredient insertion (e.g., at a target foodstuff container and/or placement location) via a grasp cavity of the utensil. Additionally or alternatively, the end effector system can function to shape a profile of ingredients (e.g., upon insertion). Additionally or alternatively, the end effector system can function to evacuate ingredients from the grasp cavity (e.g., clearing out ingredients adhering to the utensil).

The end effector system and/or an actuator thereof is preferably configured to mount to a distal end of a robotic assembly system, such as a robotic pick and place system, gantry-style assembly system, multi-axis robotic arm, and/or other robotic assembly system. In variants, the system can be used in conjunction with the robotic assembly system and/or method as described in U.S. application Ser. No. 17/881,475, filed 4 Aug. 2022, which is incorporated herein in its entirety by this reference. In an example, the end effector and/or actuator are configured to mount to a distal end of a robotic arm (e.g., multi-axis robotic arm; collaborative robotic arm; etc.). However, the end effector system 100 can be configured to operate with any other suitable robotic system and/or in any other suitable robotic assembly context.

In variants, the end effector system and/or each component thereof (e.g., utensil) can be configured to be individually or collectively certified in compliance with various food industry standards (e.g., NSF food safety standards; food safe), and/or may otherwise be considered 'food safe'. For example, variants can include or be utilized in conjunction with NSF H1 food safe grease (e.g., at each revolute joint) and/or food safe epoxy (e.g., to seal/cover an external opening/cavity, etc.). Additionally or alternatively, variants may be utilized outside of food applications and/or in various alternative contexts without food safety requirements/standards; and/or may be otherwise configured.

In variants, the end effector system and/or each component thereof (e.g., utensil) can be configured to be individually or collectively certified in compliance with various ingress protection standards (e.g., IP65; IP67; IP67+; etc.). However, variants may be utilized outside of industrial applications and/or in various alternative contexts without certified compliance with ingress protection requirements/standards; and/or may be otherwise configured.

Figure 25A:
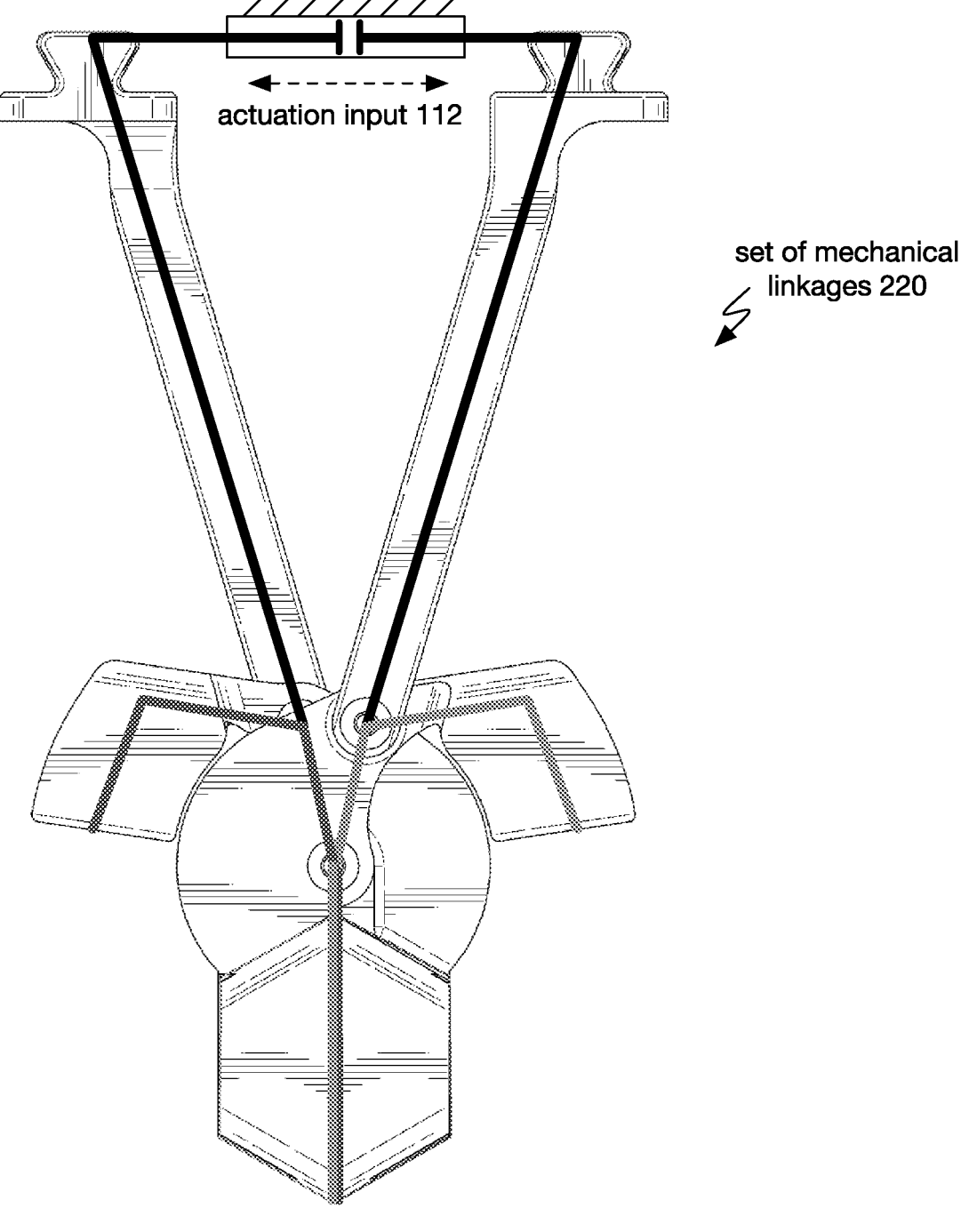
FIGS. 25A-25B are elevation views from the front of a variant of a utensil in a first and second configuration, respectively, illustrating the set of mechanical linkages.
Figure 25B:
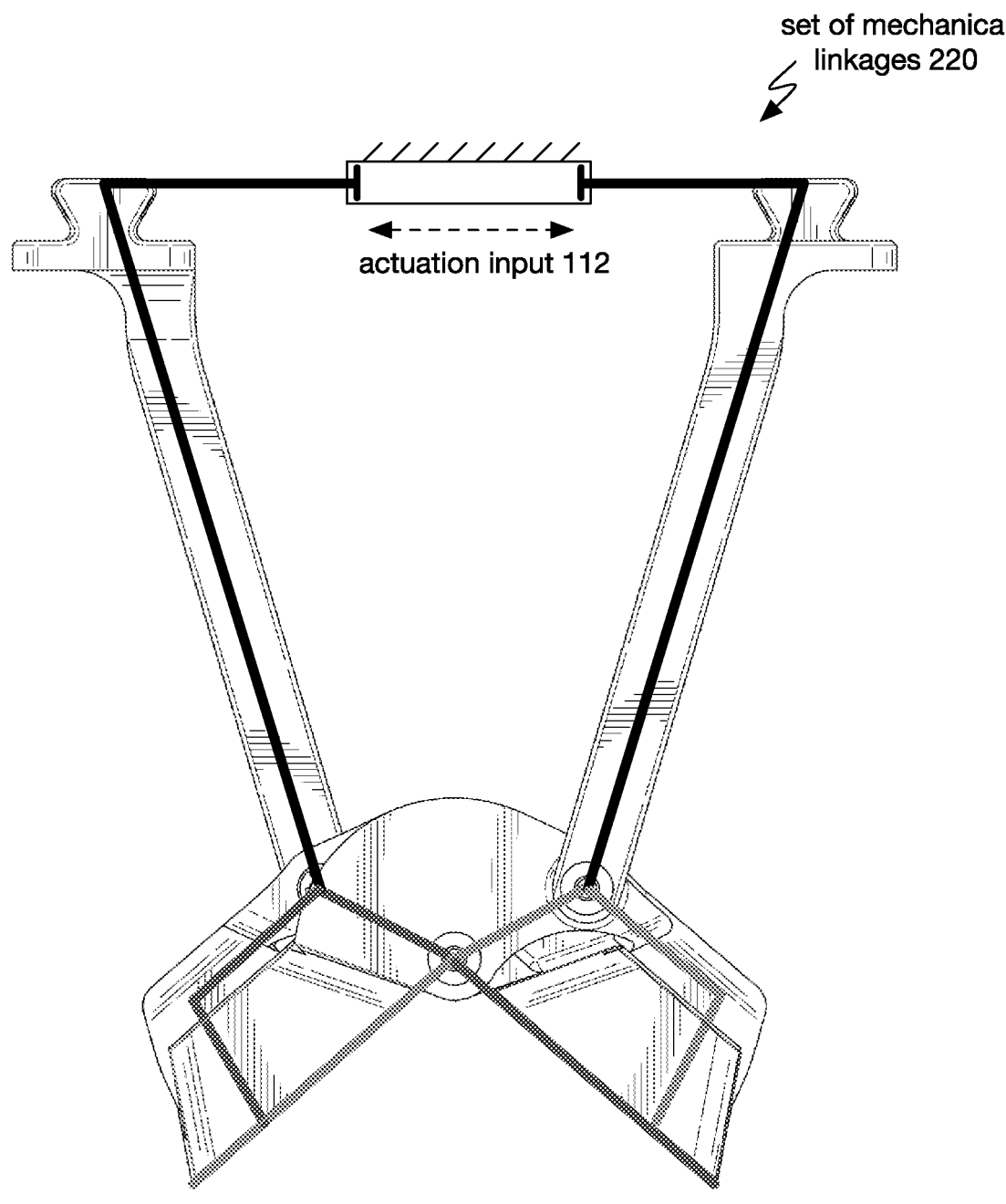

The end effector can optionally include an actuator 110 which functions to provide an actuation input to the set of mechanical linkages to transform the scoops and/or grasp cavity (and/or foodstuff ingredients housed therein). The actuator is preferably mounted to the terminal end of a robotic assembly system (e.g., wrist of a multi-axis robot arm; final stage of a gantry system; etc.) and/or integrated into a robotic assembly system, but can be otherwise implemented. The actuator can be powered: electrically (e.g., servo or motor actuation), pneumatically, hydraulically, and/or otherwise suitably powered. The actuation input provided by the actuator can be linear, rotational, or a combination thereof. The actuator can act in a single direction (e.g., with an opposing spring-loaded return; single acting) or bi-directionally (e.g., powered in both directions along an actuation axis; double acting). The actuator can have a single actuation end (e.g., with an opposing end fixedly mounted) or two actuation ends (e.g., actuating in opposite directions and centrally mounted between the actuation ends; an example is shown in FIGS. 25A and 25B). As an example, the actuator can be a linear actuator (e.g., providing a linear actuation stroke as an actuation input). As a second example, the actuator can be an electric motor (e.g., providing a rotational actuation as an input and/or a combined rotation/translation as an actuation input). In variants, the end effector can be a rotary end effector, an angular end effector, and/or any other suitable end effector with any other suitable actuation.

The actuator can be communicatively coupled to a robot controller (e.g., electrical communication; fluid communication; etc.) and/or powered by a robot controller or other robotic control system. In variants, the actuator can be a pneumatic actuator driven by a pneumatic pressure within a pneumatic actuation line (e.g., selectively coupled to a pressurized chamber with electronically actuated valves, such as solenoid valves, controlled with the controller). In such variants, the pneumatic line pressure and/or chamber pressure coupled thereto can be controlled, uncontrolled, static, dynamic, and/or pneumatic actuators can be otherwise actuated. For example, in variants, the actuator can actuate the utensil with an input force corresponding to a grasp force (e.g., at a distal end of the scoop) and/or grasp moment based on the pressure of the pneumatic line and/or pressurized chamber. Accordingly, grasp forces/moments can be controlled (e.g., by controlling the pneumatic pressure), dynamic (e.g., based on a dynamic pressure changes of the pneumatic line), predetermined (e.g., based on a manual setting at an HMI and/or a predetermined configuration of a robotic assembly system), static, varied, indirectly controlled, uncontrolled (e.g., not directly controlled), and/or otherwise implemented. In an example, a grasp moment can be a moment of about a hinge axis of a scoop. In a second example, a grasp force can be the force at a distal end of a scoop. In a third example, a grasp force can be the force between a scoop and foodstuffs at a contact point. However, the actuator can be otherwise suitably actuated.

In variants, the actuator (and/or the robot supporting the actuator) can optionally be housed within and/or contained by a suit (a.k.a. jacket) which functions to enable cleaning and/or functions to protect actuator from particulate ingress or soiling. The suit can be disposable (e.g., enabling cleaning by replacement of the suit), removable (e.g., manually removed for cleaning, such as via a machine wash), and/or cleanable by wipe down and/or wash down processes. The suit can be sealed against the robot, meeting or exceeding IP67 standards (e.g., separating the enclosed volume of the suit from the utensil), but can be otherwise suitably implemented. As an example, the actuator can be enclosed by a single suit which is formed with heat welded or sonically welded seams. However, the actuator can otherwise be unenclosed (e.g., designed to satisfy food compatibility and/or ingress protection standards; such as IP67 and/or NSF food safety compliance standards) and/or used without a suit or covering (e.g., such as in secondary applications, line operations which do not involve food, etc.).

However, the system can otherwise include or be used in conjunction with any other suitable actuator; or can otherwise altogether exclude an actuator.

Figure 2A:
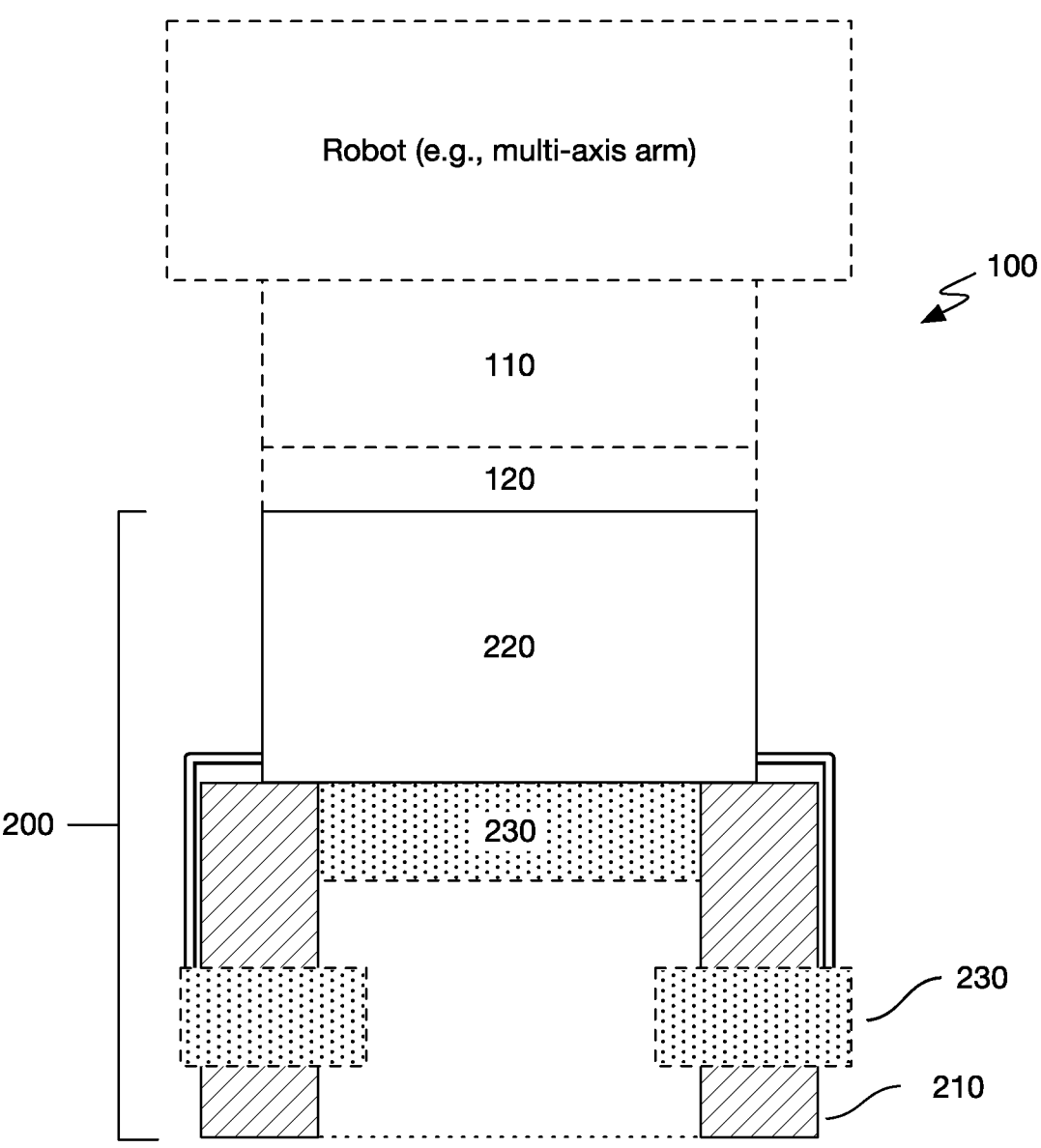
FIGS. 2A and 2B are schematic representations of a variant the end effector system in a first and second configuration, respectively.
Figure 2B:
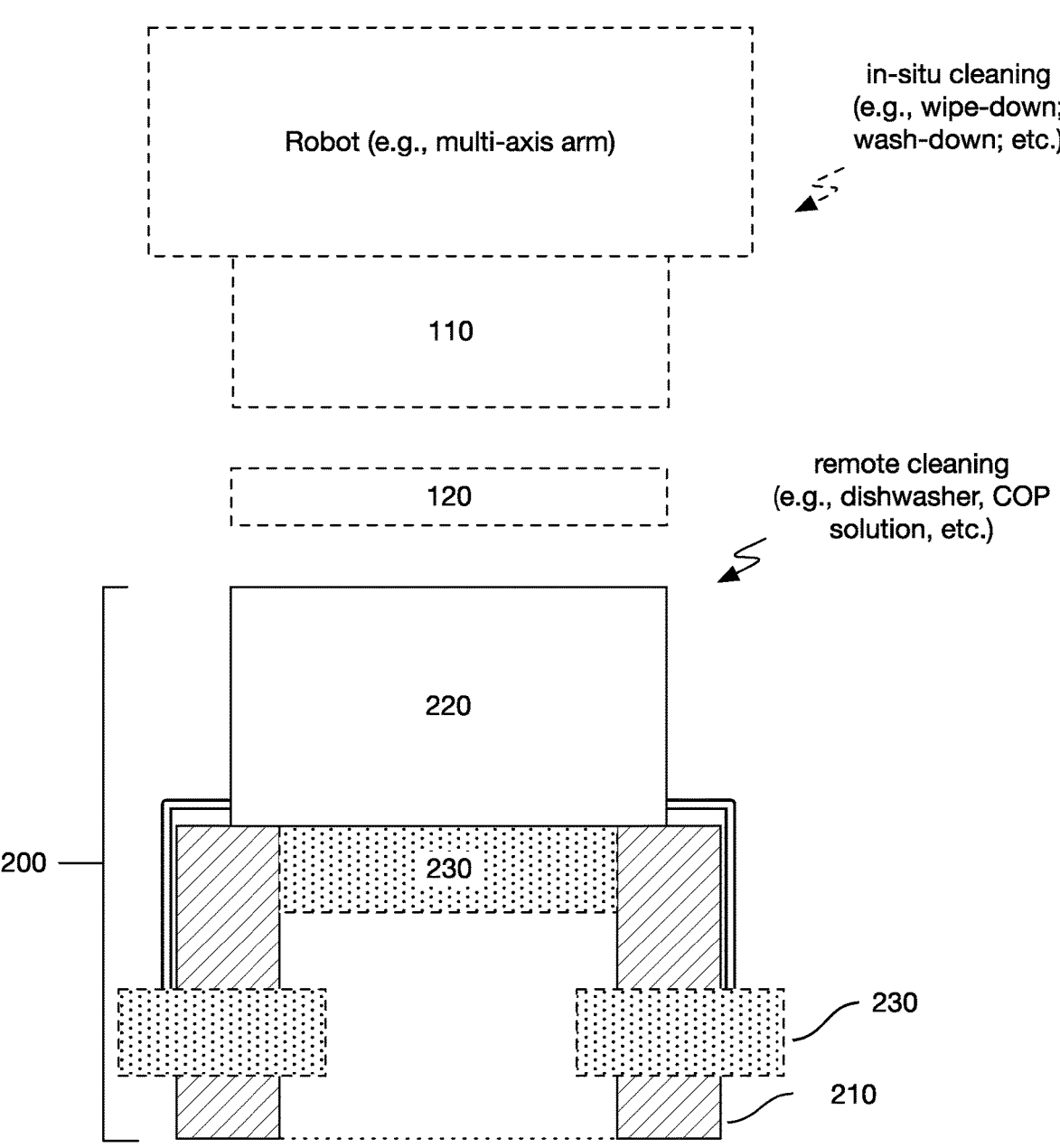

The end effector can optionally include a utensil mating connector(s) 120 which functions to mount the utensil to the actuator along a mating interface. Additionally or alternatively, the utensil mating connector can function to transfer forces/moments between the set of mechanical linkages and the actuator (e.g., actuating ends thereof). Additionally or alternatively, the utensil mating connector(s) can function to facilitate utensils to be interchangeably swapped (e.g., for ingredient-specific utensils and/or utensils to be swapped based on a desired pick amount) and/or removed (e.g., to facilitate remote/dishwasher cleaning; example configurations are shown in FIGS. 2A and 2B; examples configurations are shown in FIGS. 15A-C).

Figure 10:
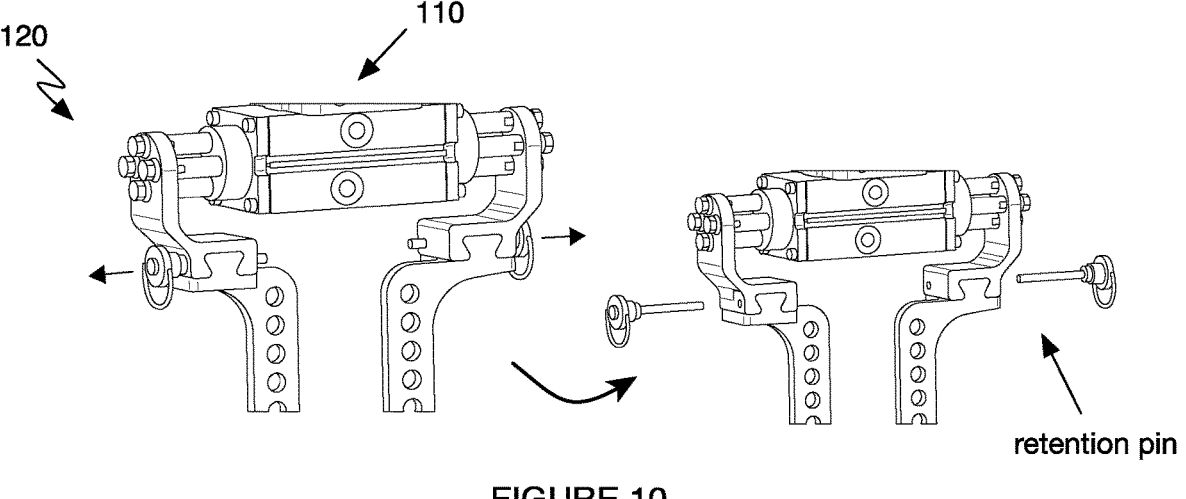
FIG. 10 is a partial 3D representation of a variant of the end effector system.
Figure 11:
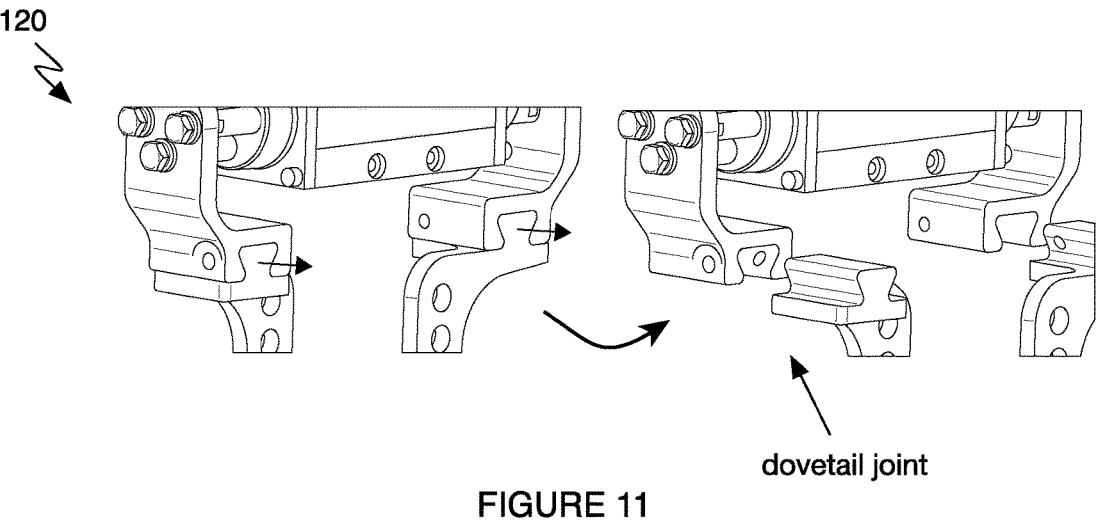
FIG. 11 is a partial 3D representation of a variant of the end effector.

The utensil mating connector preferably defines a mating interface (e.g., an example is shown in FIGS. 10 and 11; pair of opposing bearing surfaces in contact), which may facilitate attachment and/or removal of the utensil. More preferably, the mating interface preferably facilitates a tool-less, quick removal (quick-release) and/or attachment. In order to facilitate the quick attachment and detachment of utensils from the robotic system in the field for the cleaning of used utensils or for switching to another utensil for a different ingredient, tool-less mechanisms can be changed quickly by hand. More preferably, the mating connector is configured to maintain a tight/substantially-rigid interface between the fingers and components attached to the gripper, so that the motions of the utensil can be precisely controlled by the gripper without any backlash (e.g., less than 0.1 deg angular backlash, less than 0.2 mm, less than 0.05 mm, less than 0.02 mm, zero backlash, etc.). For example, the mating interface can be a linear plain bearing slide (e.g., dovetail, boxway, bushing, etc.) or rotational interface (e.g., cam lock, screw, conic interface, etc.). The mating interface can be secured manually (e.g., pinned), automatically (e.g., by a pneumatic collar, by an electromechanical or magnetic retention mechanism; by a passive retention spring; etc.), actively, passively; and/or via any other suitable fasteners or retention features. As an example, the mating interface can be secured by way of a snap-fit, mechanical quick-disconnect, balllatching interface, pinned interface (e.g., an example is shown in FIG. 10), and/or any other suitable retention mechanism(s).

Figure 20A:
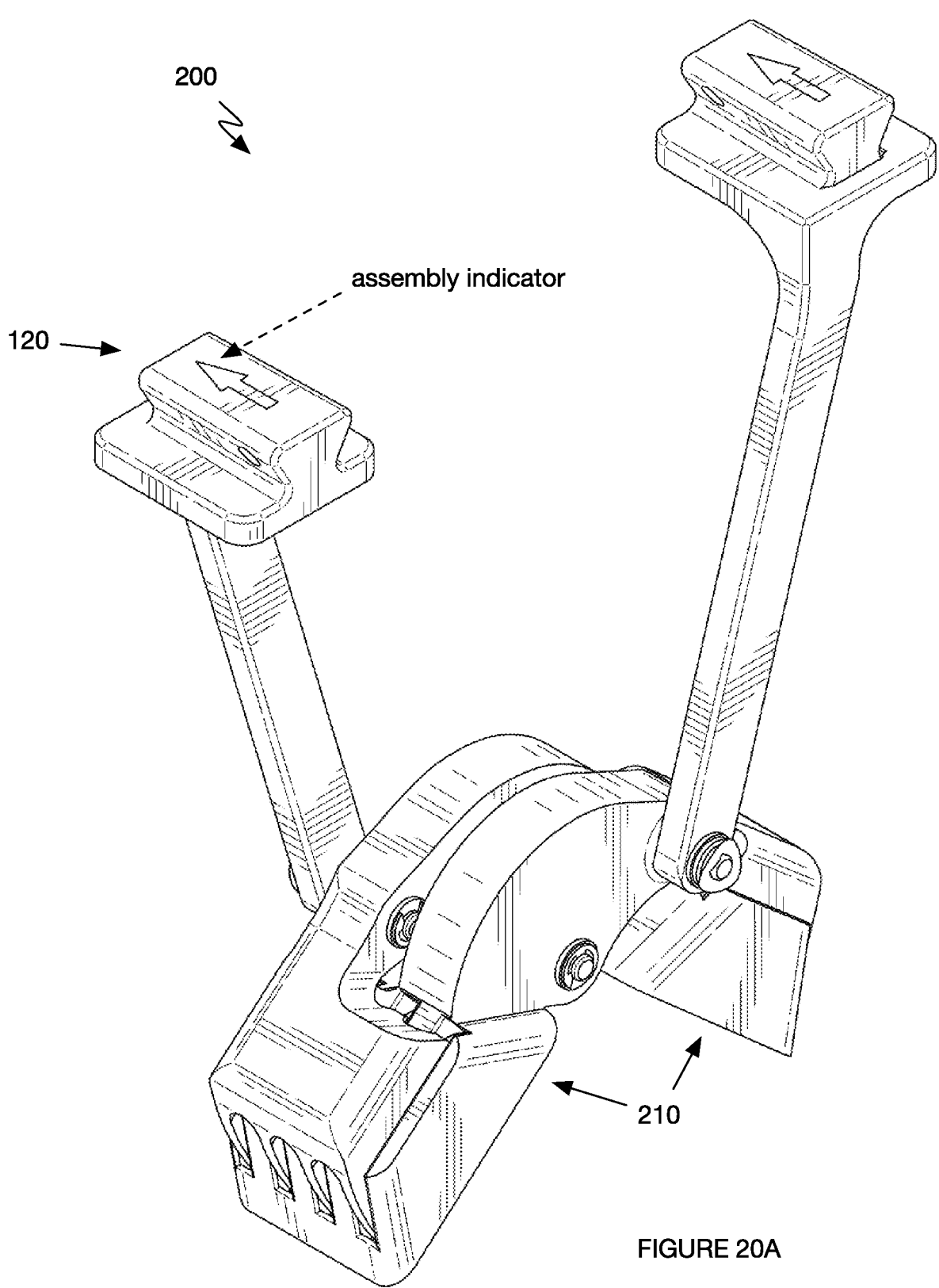
FIG. 20A is an isometric view, from the front top left, of a first variant of a utensil in a grasp configuration.
Figure 20B:
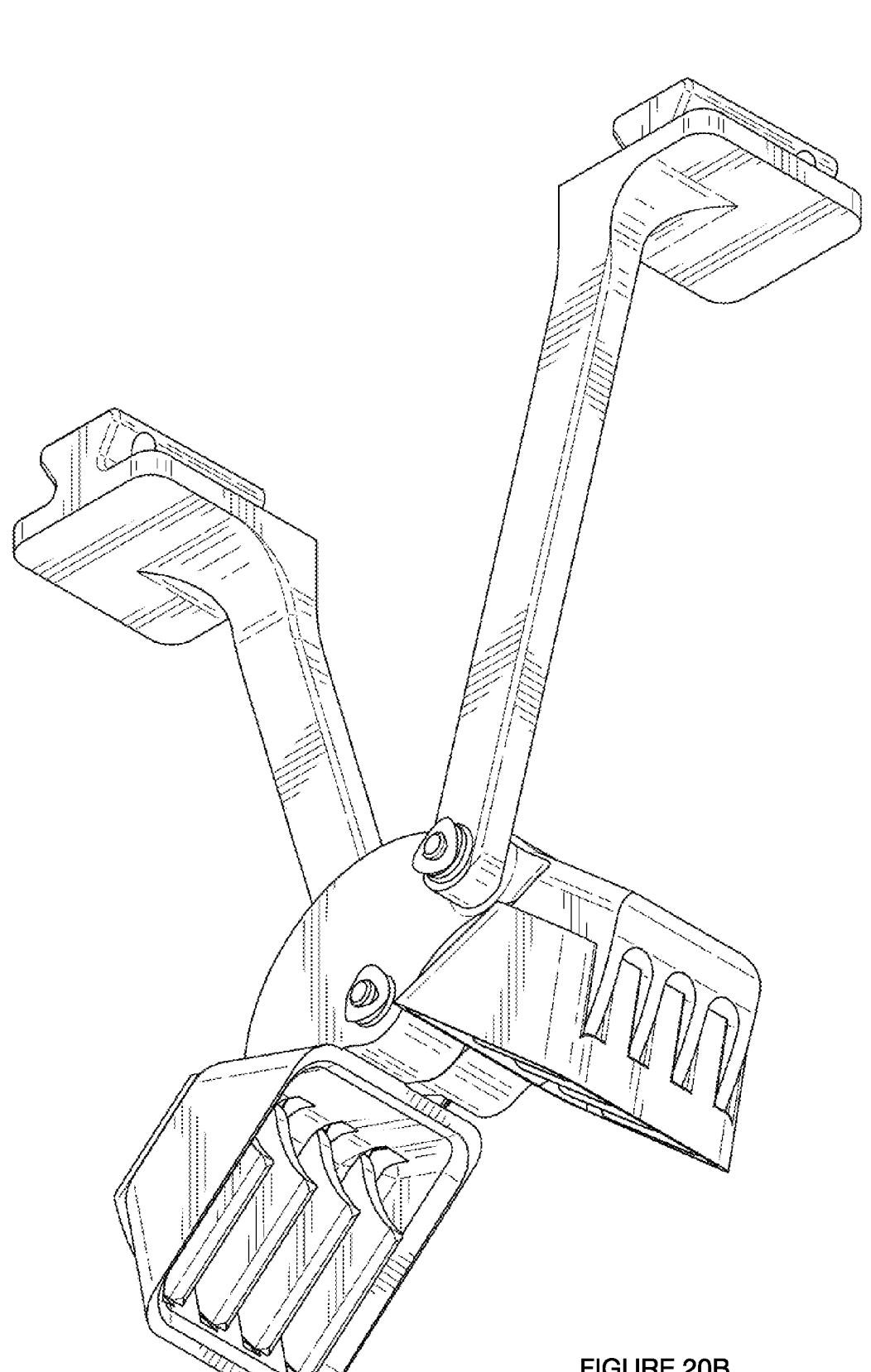
FIG. 20B is an isometric view, from the back bottom right, of the first variant of a utensil in the grasp configuration.
Figure 21A:
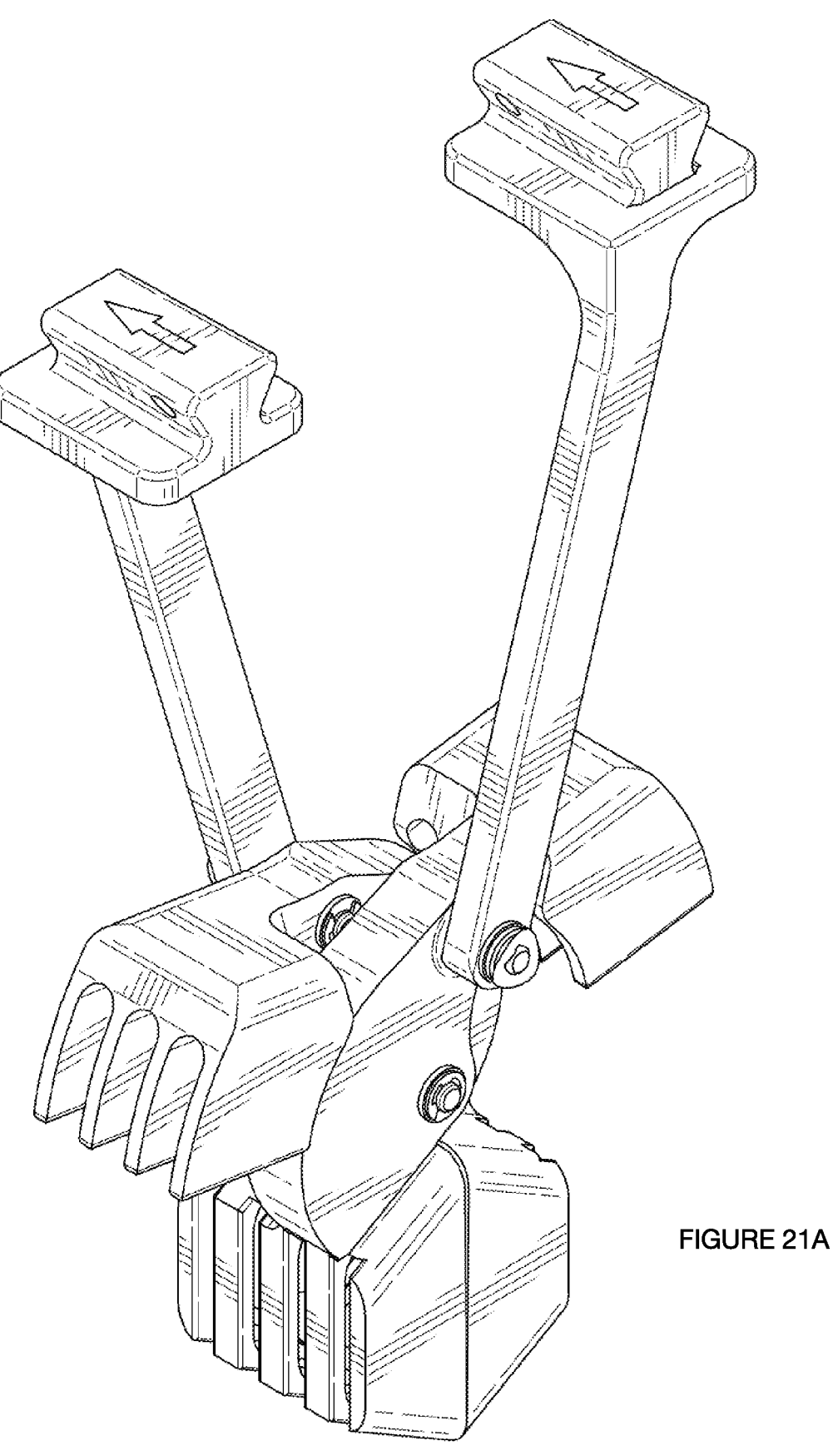
FIG. 21A is an isometric view, from the front top left, of a first variant of a utensil in the anti-grasp configuration.
Figure 21B:
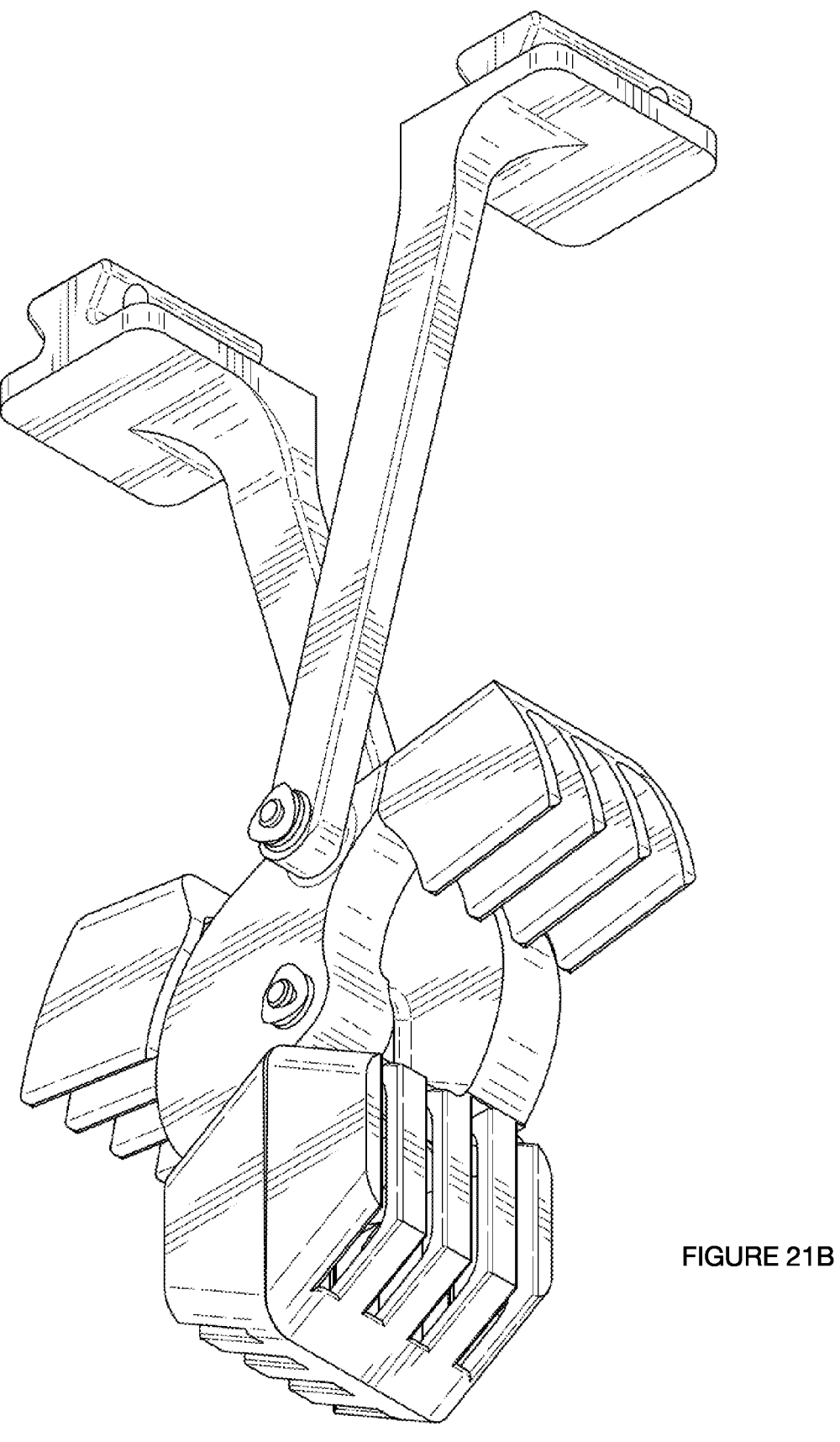
FIG. 21B is an isometric view, from the back bottom right, of the first variant of a utensil in the anti-grasp configuration.
Figure 23A:
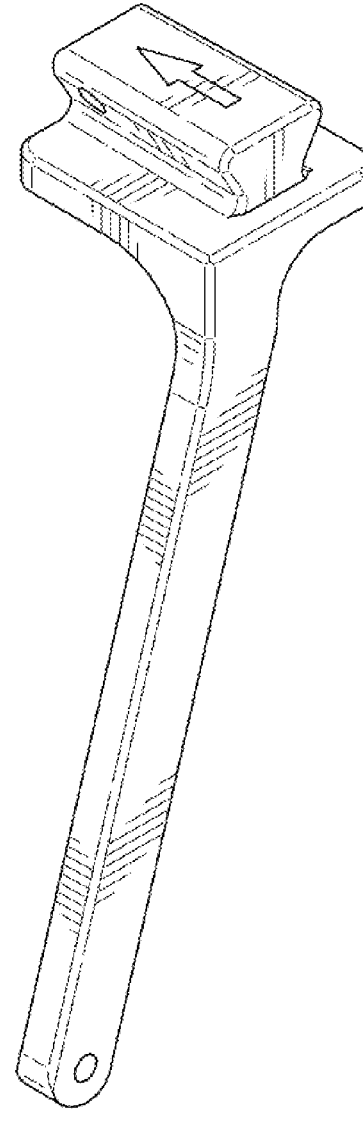
FIGS. 23A-B are isometric views, from the front top left and back bottom right, respectively, of a first variant of a utensil extender.
Figure 23B:
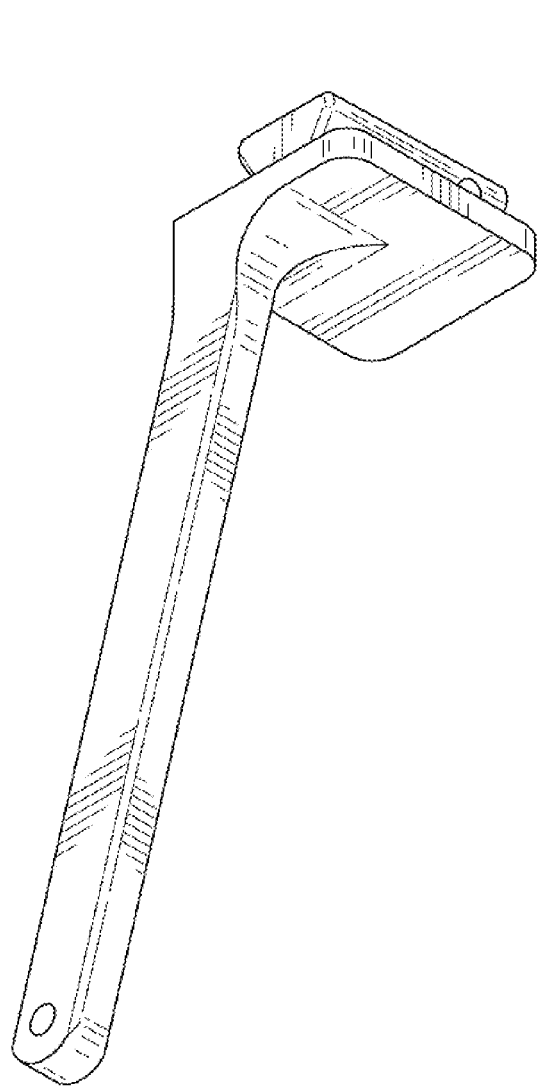

In one variant, the utensil mating connector(s) can include a tapered dovetail connection(s), an example of which is shown in FIG. 23C. A slight taper angle (e.g., 0.5 degrees to 2 degrees; 1 degree taper) and a tight manufacturing tolerance (e.g., tolerance of 0.02 mm or less, etc.) may increase overall rigidity and assembly robustness. For example, tapered connections, particularly when used in conjunction with manual assembly indicators (e.g., arrows, assembly indicator markings, etc.; examples are shown in FIGS. 20A, 21A, and 23C) may poka yoke the system by eliminating possibility of incorrect/unintended assembly configurations which are visually similar to the nominal assembled configuration (e.g., particularly when elements have a high degree of symmetry). Additionally or alternatively, the tapered dovetail may eliminate assembly symmetry of the system (e.g., where there is exactly one assembly direction/configuration). Tapered dovetails can be manufactured by wire EDM or another material removal manufacturing process (e.g., CNC milling, etc.), but can be otherwise formed/fabricated.

In variants, such quick-change mechanisms may allow the same actuator (and/or robot) to be efficiently used with different utensils and, accordingly, allow the same actuator to manipulate different ingredients, pick different portion sizes, and/or place at different endpoints.

Figure 24A:
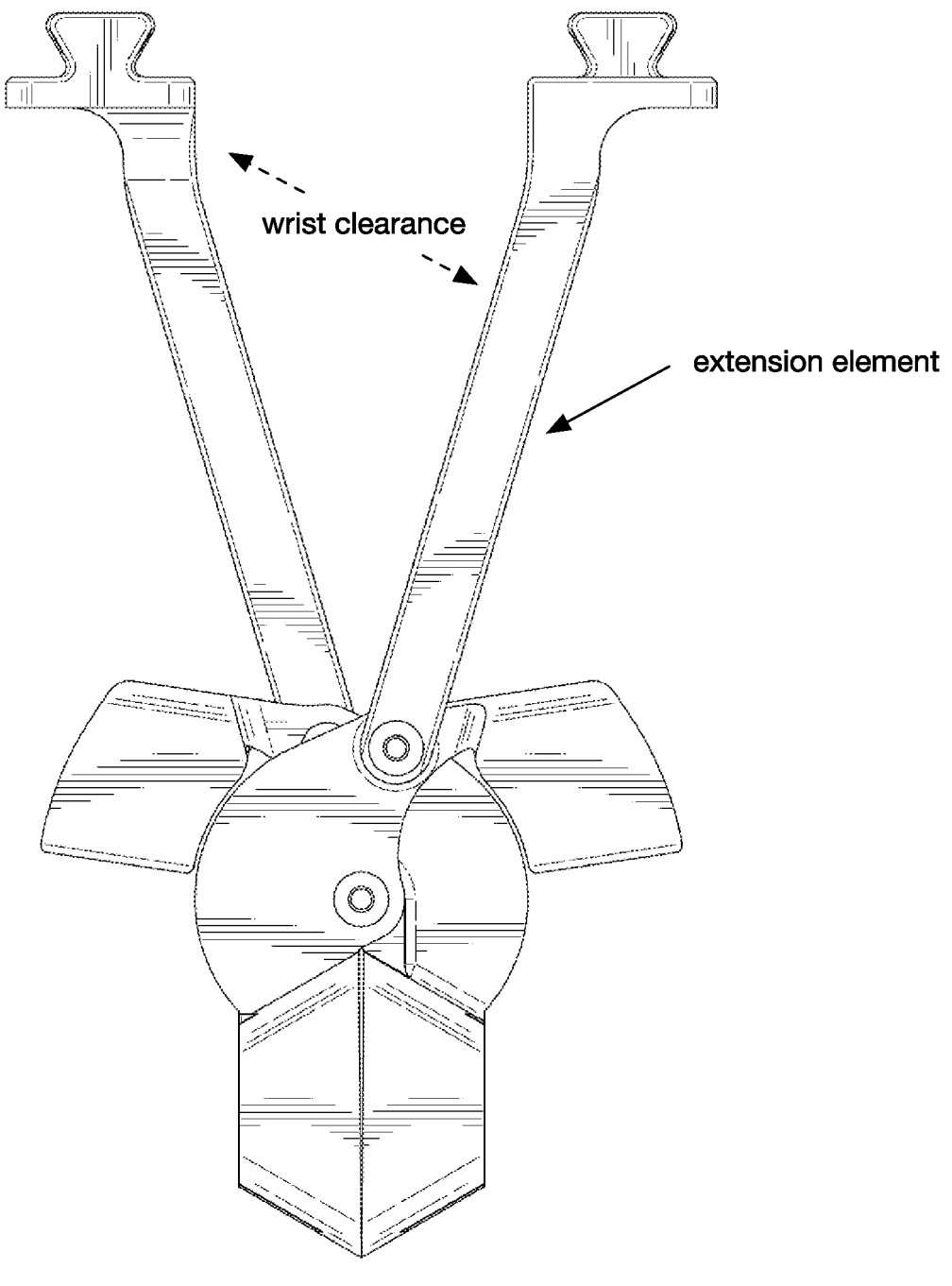
FIGS. 24A-24B are elevation views from the front of a variant of a utensil in a first and second configuration, respectively.
Figure 24B:
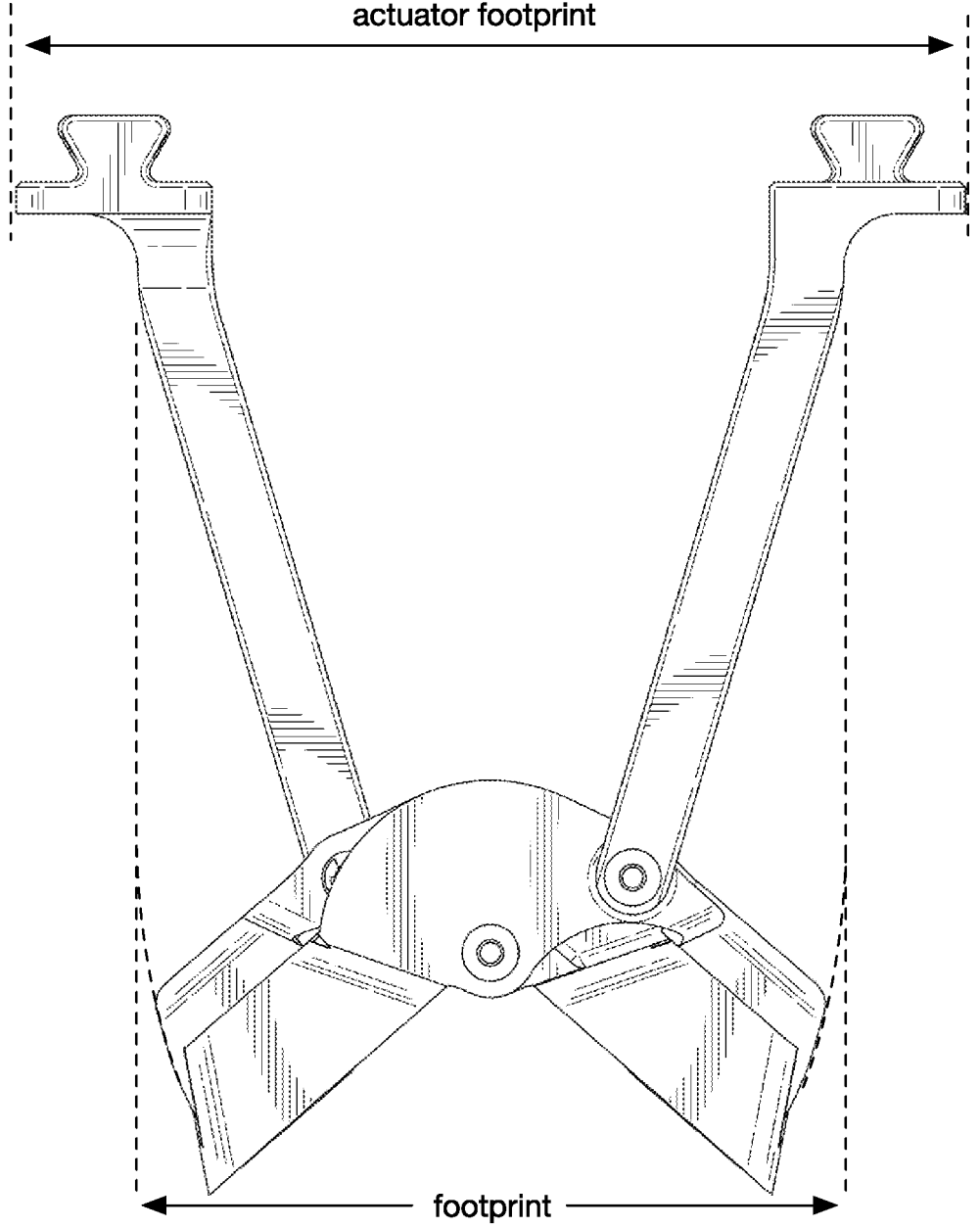

The utensil mating connector(s) can include and/or interface with an extension element(s) (e.g., examples are shown in FIGS. 12A-12B, 21A-21B, and 23A-D) which can function to physically distance the utensil from the actuator (and/or robotic assembly system). In particular, physically distancing the utensil from the actuator may advantageously distance the robot and/or end effector from the food ingredients being manipulated, reducing the potential for soiling and/or collisions. Further, physically distancing the utensil from the actuator may dissociate the physical footprint of the actuator (and/or terminal end of a robot arm; an example is shown in FIG. 24B) from the utensil, allowing food manipulation by the utensil to be unhampered (e.g., when reaching into deep containers and/or food pans) by dimensional constraints of the actuator. As an example, the extension element may facilitate utensil accesses a pick area (and/or volume) within a food container which is independent of actuator dimensions, thus allowing the use of larger actuators to achieve greater forces and/or stroke lengths (e.g., which can increase the versatility and/or efficacy of various utensils; an example is illustrated FIGS. 25A-25E). As a second example, the extension elements may allow separate bounding boxes (e.g., with separate footprints) to be utilized for the utensil and the actuator. Accordingly, in variants where the extension element increases the length of the tool to greater than a depth of a foodstuff bin (e.g., 2.5 inches, 4 inches, 6 inches, 8 inches, greater than 8 inches, etc.), the driving collision constraints can be based on the pick depth and an offset of the utensil footprint relative to the foodstuff bin wall(s), as opposed to being driven/limited by the collision box of the actuator. However, the actuator may drive various collision constraints (e.g., internal/self-collisions, etc.) and/or the utensil can be otherwise controlled based on any suitable collision constraints.

Figures 25C, 25D, 25E:
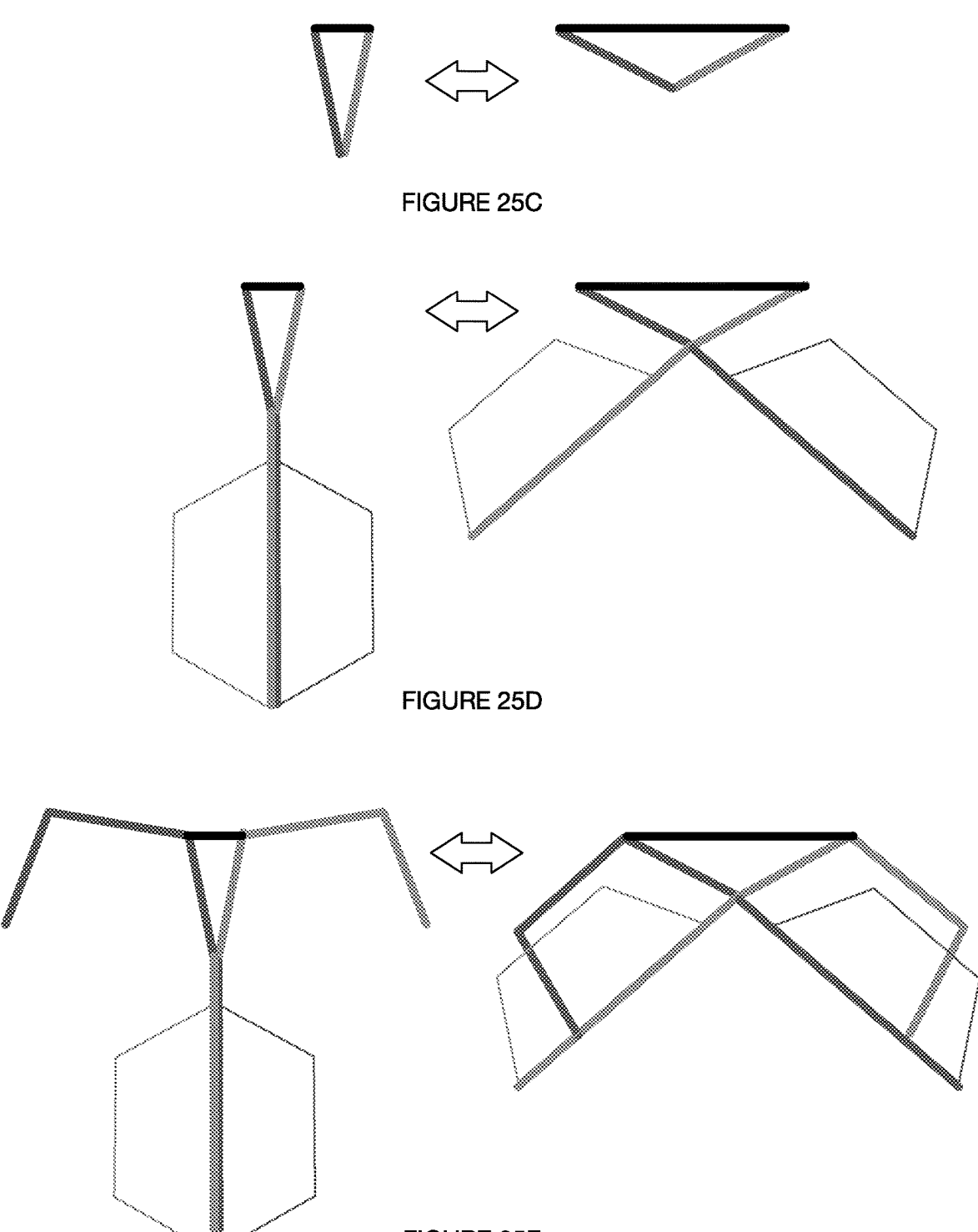
FIGS. 25C-25E are a first, second, and third diagrammatic example, respectively, illustrating mechanical linkages in the first and second configurations.
Figure 26A:
FIGS. 26A and 26B are 3D views of a variant of the utensil in a first and second configuration, respectively.
Figure 26A:
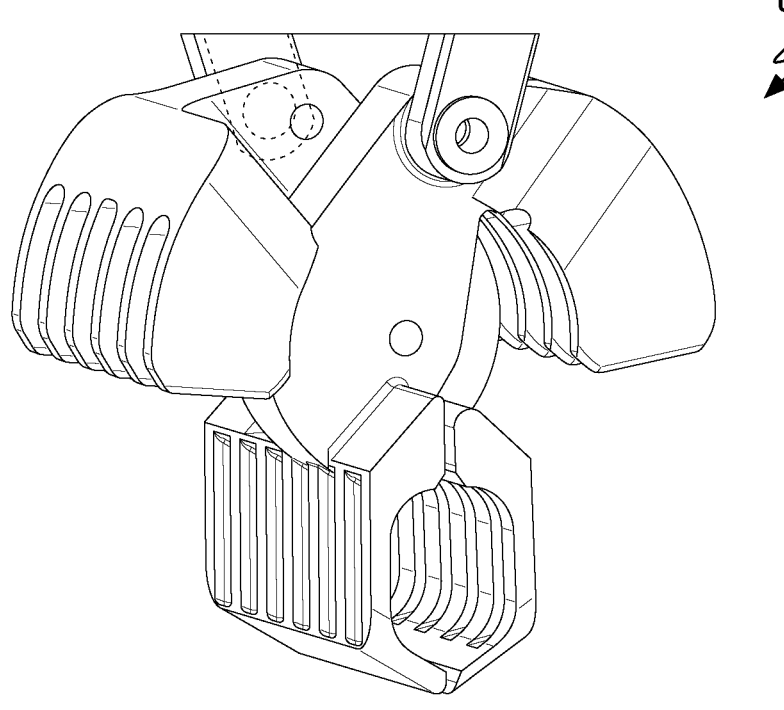
Figure 26B:
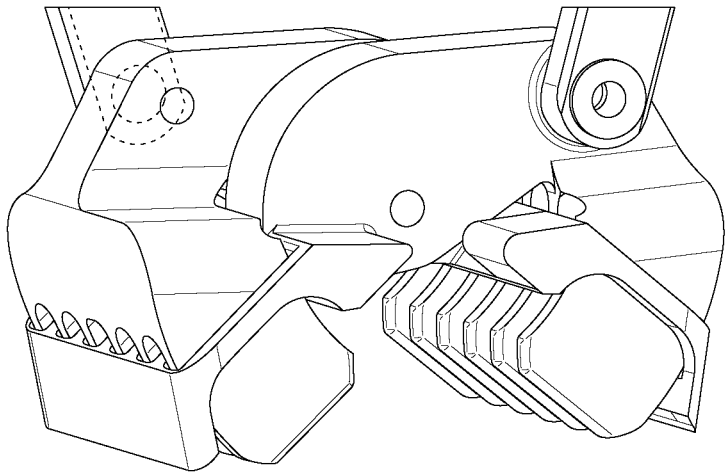
Figure 27A:
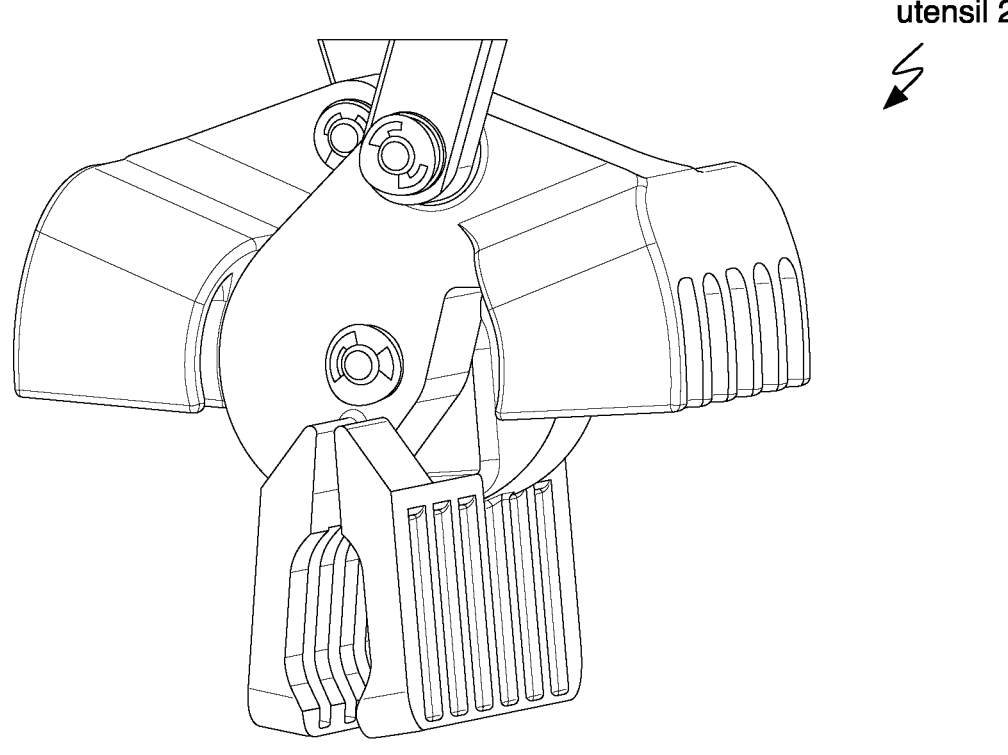
FIGS. 27A and 27B are 3D views of a variant of the utensil in a first and second configuration, respectively.
Figure 27B:
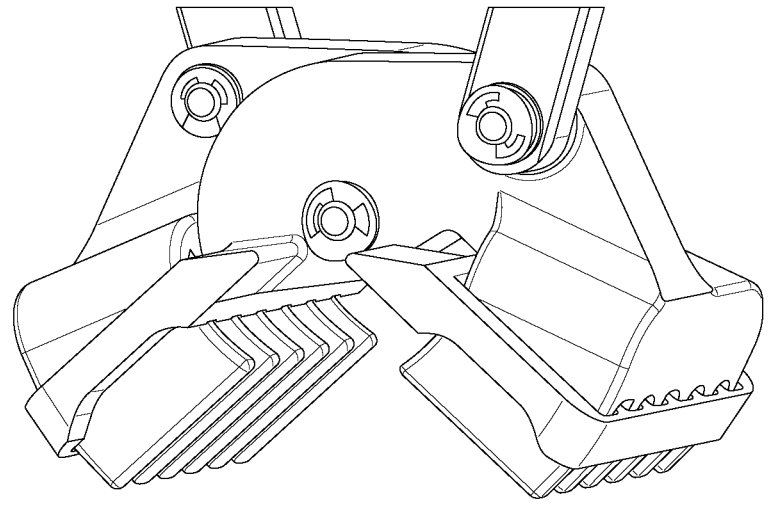
Figure 28:
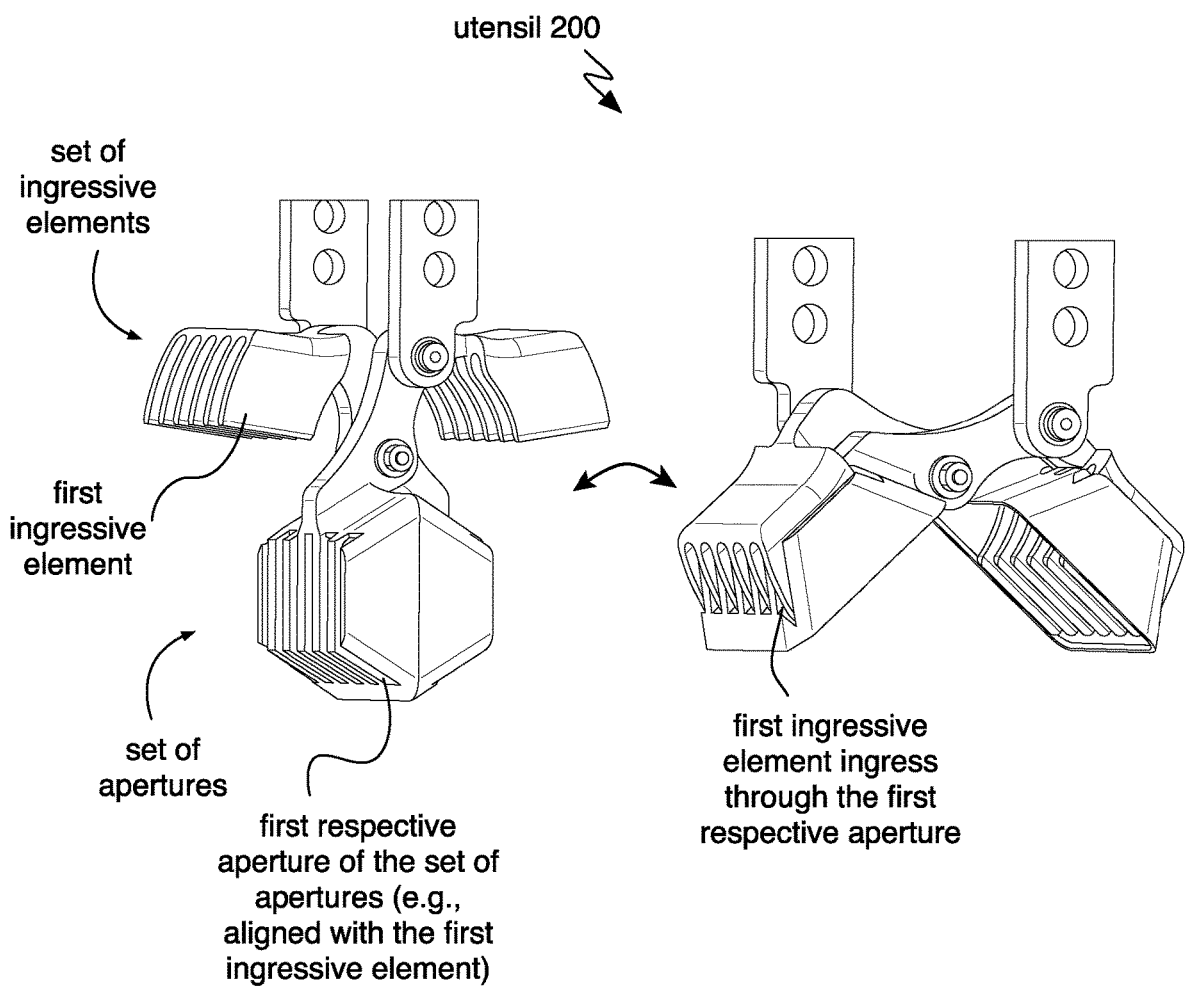
FIG. 28 is a partial 3D representation of a variant of an end effector.
Figure 29:
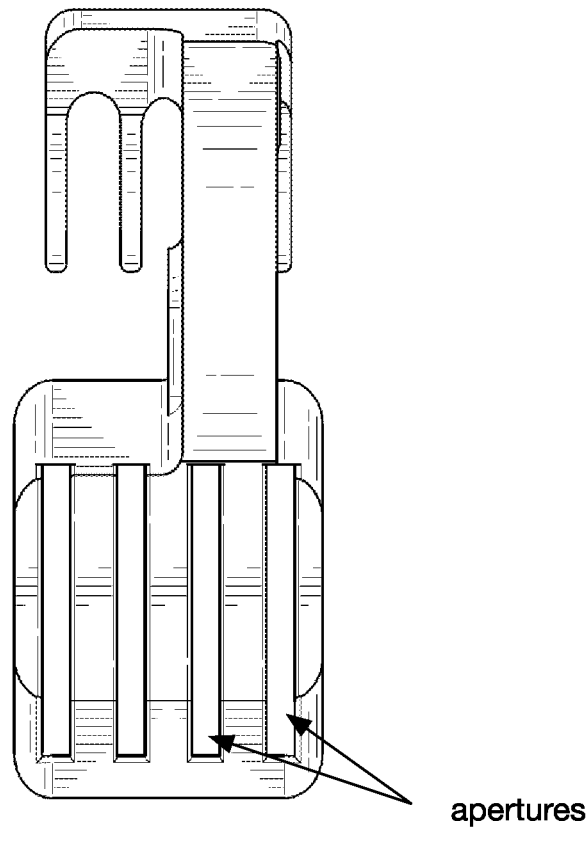
FIG. 29 is an elevation view from the left of the first variant of a scoop, integrated with a set of ingressive elements.
Figure 30:
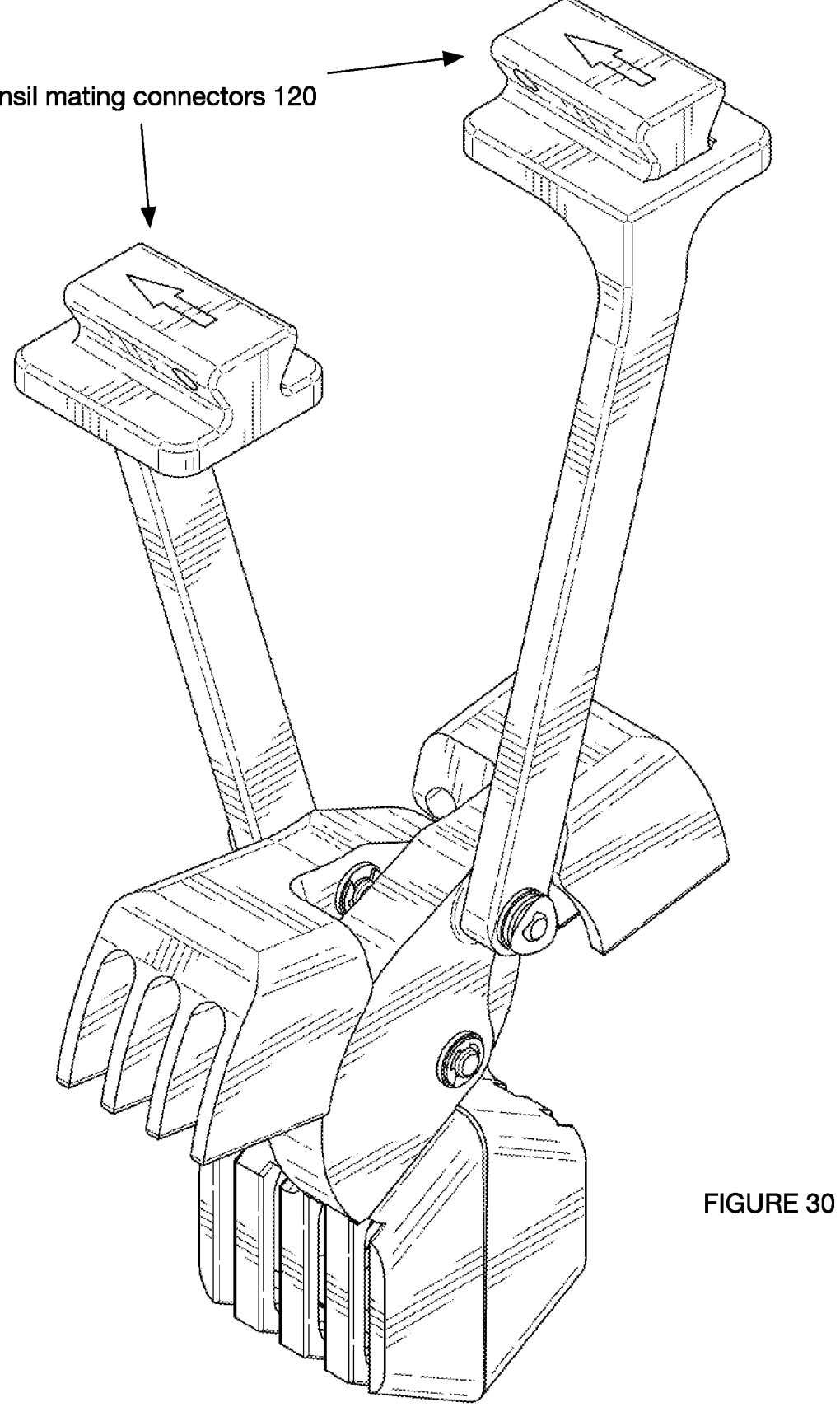
FIG. 30 is an isometric view, from the front top left, of a first variant of a utensil in the anti-grasp configuration.

Extension elements are preferably oriented to offset the utensil along a direction perpendicular to an actuation input (e.g., relative to a direction of a linear actuation; relative to an axis of rotational actuation), but can alternatively extend in the same direction as the actuation input (e.g., for vertical-acting actuators), be angled/skewed, and/or otherwise offset the utensil from the actuator. In variants, extension elements can be oriented to offset the utensil along a direction perpendicular a mating interface and/or mating fastener (e.g., perpendicular to pinned connection, an example of which is shown in FIG. 10; perpendicular to a direction of a dovetail mate, an example of which is shown in FIG. 11; etc.). As an illustrative example, where a robot may generally execute picks substantially vertically in a "top-down" direction, extension elements may be individually or collectively oriented substantially vertically in nominal operating configurations (e.g., at time of actuator actuation, during pick execution, during insertion, etc.; with a vertically oriented V-shape), offsetting the utensil from the actuator in a vertical direction. In variants, the extension elements can be sized based on a depth of a foodstuff bin and/or maximum pick depth (e.g., which may allow ingredient picking without the actuator entering an interior volume of a foodstuff container). In a first example, the extension element(s) can offset the utensil from the actuator by: less than 5 cm, 5 cm, 8 cm, 10 cm, 12 cm, 15 cm, 20 cm, 25 cm, 30 cm, 50 cm, greater than 50 cm, any range bounded by the aforementioned values, and/or any other suitable distance. In a second example, a combined length (e.g., maximal length, in an open configuration, in a closed configuration, etc.) of the extension element and the utensil is larger than a depth of an ingredient bin. In a third example, the extension elements can have a length which is greater than an actuation distance of the actuator and/or actuation input (e.g., double, triple, quadruple, etc.; which may advantageously dissociate the physical/collision footprint of the actuator from that of the utensil and/or increase the actuation distance relative to the minimum effective linkage length at the actuation end, such as illustrated in FIGS. 25A, 25B, and 25C).

Preferably, a utensil mating connector establishes a (passive) mechanical connection between each actuation end of the actuator and the utensil (e.g., a corresponding element of a mechanical linkage thereof), but can otherwise suitably connect the actuator and the utensil. Accordingly, a utensil mating connector can include a first component mounted to the actuator (and/or integrated with the actuator), which interfaces (via the mating interface) with a second component connected to the utensil. The extension can be at the utensil side of the mating interface (e.g., an extension element can include the features defining the utensil side of the mating interface) and/or at the actuator side of the mating interface. As an example, the mating interface can be proximal to the actuator (e.g., closer to the actuator than the grasp cavity) or proximal to the utensil (e.g., closer to the grasp cavity than the actuator.

In a specific example, the utensil mating connector can include a pair of tapered dovetail joints defining substantially parallel primary axes (respective assembly directions, etc.) and retained with manual retention pins which are substantially orthogonal to the respective primary axes.

The utensil mating connector(s) and/or components thereof can be manufactured from titanium, stainless steel, aluminum (e.g., anodized), but can include any other suitable materials or material composition. The utensil mating connector(s) can be manufactured by a material removal process (e.g., wire EDM, CNC milling, etc.), but can additionally or alternatively be fabricated by casting, forming, additive material processes, and/or can be otherwise fabricated.

However, the system can otherwise include or be used in conjunction with any other suitable mating components/ connector; or can otherwise exclude a utensil mating connector. As an example, the set of mechanical linkages can be directly integrated with an actuator and/or otherwise mated to an actuator.

In an example, the actuator and the utensil mating connector cooperatively define a first footprint, wherein the foodstuff utensil defines a second physical footprint, wherein a vertical projection of the first footprint extends at least partially beyond the second footprint (e.g., in one or more configurations; covering a larger area; spanning a greater length and/or width, etc.).

3.1 UTENSIL

The utensil 200 functions to grasp and/or manipulate foodstuff ingredients within a grasp cavity to facilitate ingredient picking (e.g., from an ingredient bin) and/or insertion (e.g., into a foodstuff container). Additionally or alternatively, the end effector system can function to evacuate ingredients from the grasp cavity (e.g., clearing out ingredients adhering to the utensil). Additionally or alternatively, the end effector system can function to shape a profile of ingredients (e.g., upon insertion). The utensil can include: a set of scoops; a set of mechanical linkages; a set of ingressive elements; and/or any other suitable components. However, the end effector system 100 can additionally or alternatively include any other suitable set of components.

The utensil and/or each component thereof is preferably passive (i.e., unpowered), transforming entirely based on mechanical transformations of the actuator and/or utensil mating connector(s). For example, the utensil may include no electrical, pneumatic, or hydraulic actuators (e.g., which may facilitate cleaning by submersion, such as in a COP solution, and/or dishwashing).

The utensil and/or each component thereof is preferably constructed from a polymer material (e.g., PolyOxyMethylene [POM] a.k.a. acetal, such as Delrin® from DuPont™; thermoplastic; etc.), but can alternatively be metal (e.g., titanium, stainless steel, aluminum, etc.) but can include any other suitable materials or material composition. The utensil can include or be coated with ceramic, Polytetrafluoroethylene [PTFE], and/or another material to prevent stickage (e.g., adhesion), but can be otherwise coated/uncoated (e.g., anodized or powder coated). The surfaces of the utensil (e.g., such as the grasp surfaces, ingressive surfaces, and/or shaping surfaces) are preferably smooth and easily cleanable (e.g., in accordance with NSF requirements); however, the utensil can be otherwise textured/coated.

In variants, the utensils and/or components thereof can have an exterior appearance which is visually distinct from a set of target ingredients, which may facilitate visual identification/distinction of the utensil and foodstuff ingredients. In such variants, a color range of the utensils and/or a set of components thereof can be offset from a color of a target ingredient (or set of foodstuff ingredients) by a color distance. In an example, the food utensil and/or components thereof (e.g., scoops, ingressive elements, etc.) can be substantially blue (e.g., R:0, G:0, B:255; etc.), while ingredients/foodstuffs may be separated from the color blue by at least a threshold color distance (e.g., where the overwhelming majority of foodstuffs are not blue; where the range of foodstuff ingredients being picked are not blue; where the threshold value is predetermined minimum value). For example the scoop and ingressive elements can have at least a minimum color distance to various sets of foodstuffs (e.g., set of all ingredients, target ingredient of the utensil, etc.), which can have a value of: less than 10, 25, 50, 75, 100, 125, 150, 200, greater than 200, any open or closed range bounded by the aforementioned values, and/or any other suitable minimum color distance(s) (e.g., to enable separate visual identification of utensils and foodstuffs). For instance, blue utensils and/or utensils separated from foodstuff by at least a predetermined color distance may allow human operators and/or CV-based quality control systems to verify that no chipped/broken pieces of a utensil are present in an assembled bowl of foodstuff (e.g., as a verification/validation measure). In one set of variants, a color range of each scoop of the plurality and each ingressive element of the set satisfies a minimum color distance from an aggregate foodstuff ingredient. In an example, at least one of the plurality of scoops is blue.

Figure 3:
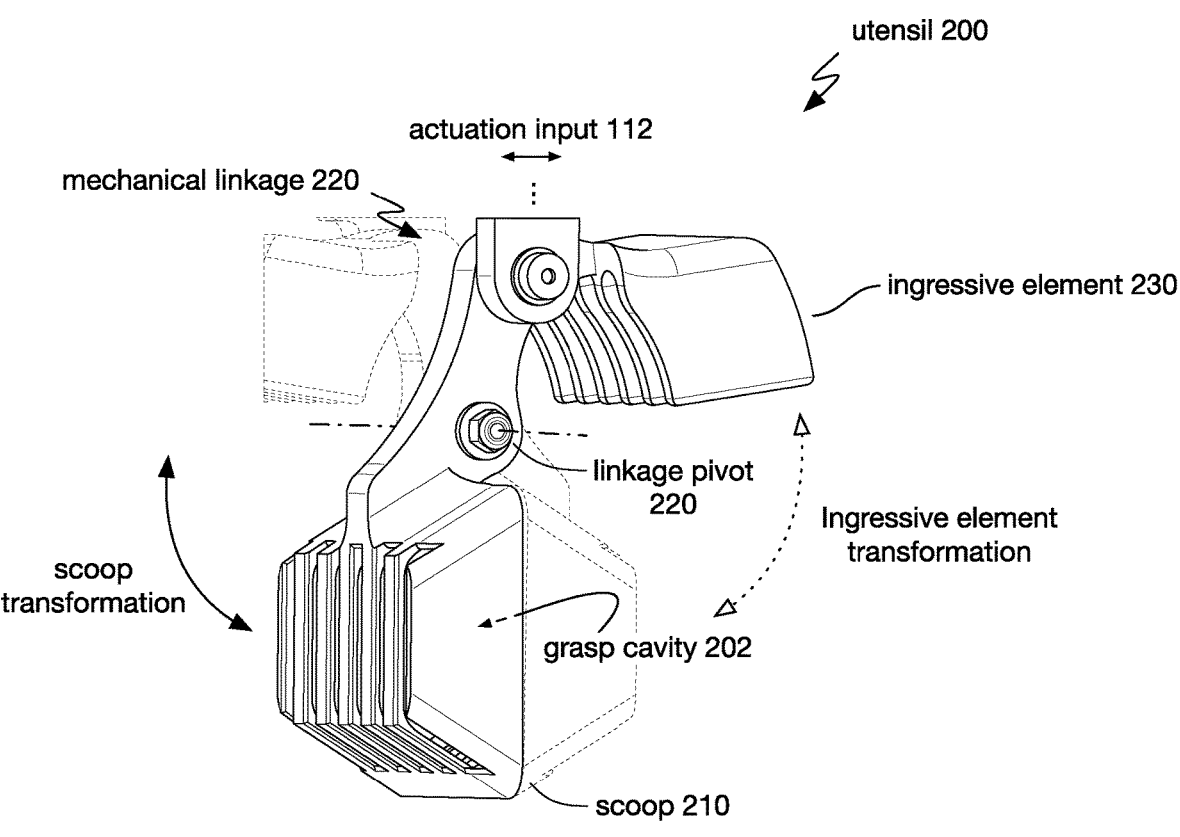
FIG. 3 is an isometric view of a first variant of a utensil.

The various components (or sub-components) of the utensil can be integrated into a unitary body, or can be formed by multiple distinct bodies (e.g., which may be constructed of the same material or different materials; which may be mechanically coupled, fastened, bonded, etc.) in any suitable combination. For example, an element of a mechanical linkage may be integrated with a body of one scoop and one ingressive element (e.g., an example is shown in FIG. 3).

The set of scoops 210 function to house, retain, and/or grasp ingredients in a grasping configuration (e.g., within a grasp volume; against a grasp surface). The set of scoops can define a grasp cavity (e.g., graspable volume of foodstuff ingredients), bounded by a grasp surface of the scoop which establishes physical contact with the foodstuff (e.g., in a grasp configuration). The grasp cavity is preferably at least partially unenclosed in a grasp configuration of the utensil. As an example, the scoops can include a set of orifices (equivalently referenced herein with the term 'apertures') which fluidly couple the grasp cavity to an ambient environment (e.g., air may pass through the thickness of the scoops via the orifices/apertures). The grasp surface can be uncoated/unfinished (e.g., stainless steel) or coated (e.g., ceramic coating; PTFE coating; food-compatible anodize or powder coat; etc.)

The scoops are preferably dimensioned to define a grasp cavity which may retain a predetermined amount (e.g., mass and/or volume) of ingredients. Accordingly, in various implementations, varying amounts of ingredients may be picked by: varying the actuation input and/or control of the robotic system (e.g., pick height above ingredients, etc.; controlling the effective utilization of the grasp volume) and/or by selectively interchanging the utensils based on the size of grasp volume (e.g., replacing the utensil for different desired pick amounts; utensil dimensions may be varied, such as selectively utilizing the variants of the utensil illustrated in FIGS. 6, 7, and 8).

Figure 4:
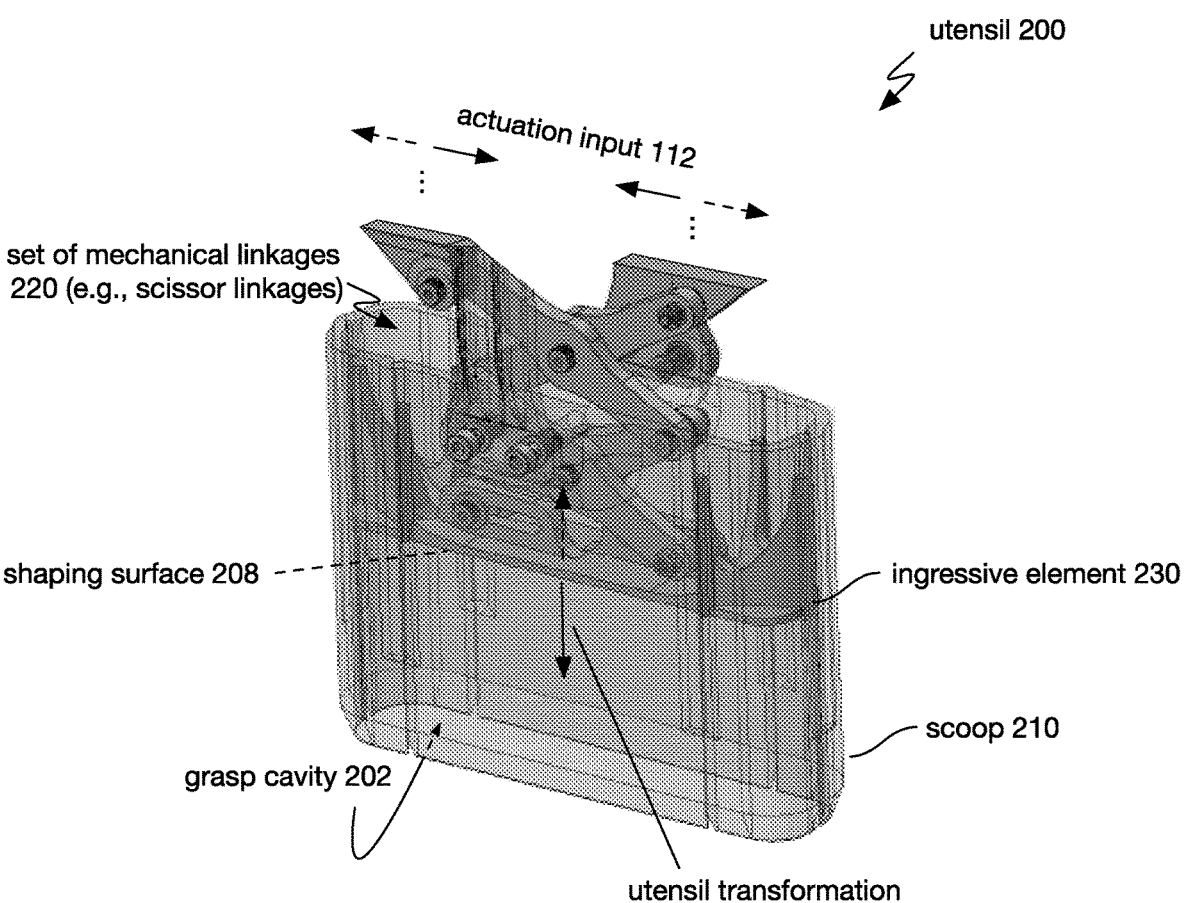
FIG. 4 is an isometric view of a second variant of a utensil.
Figure 5:
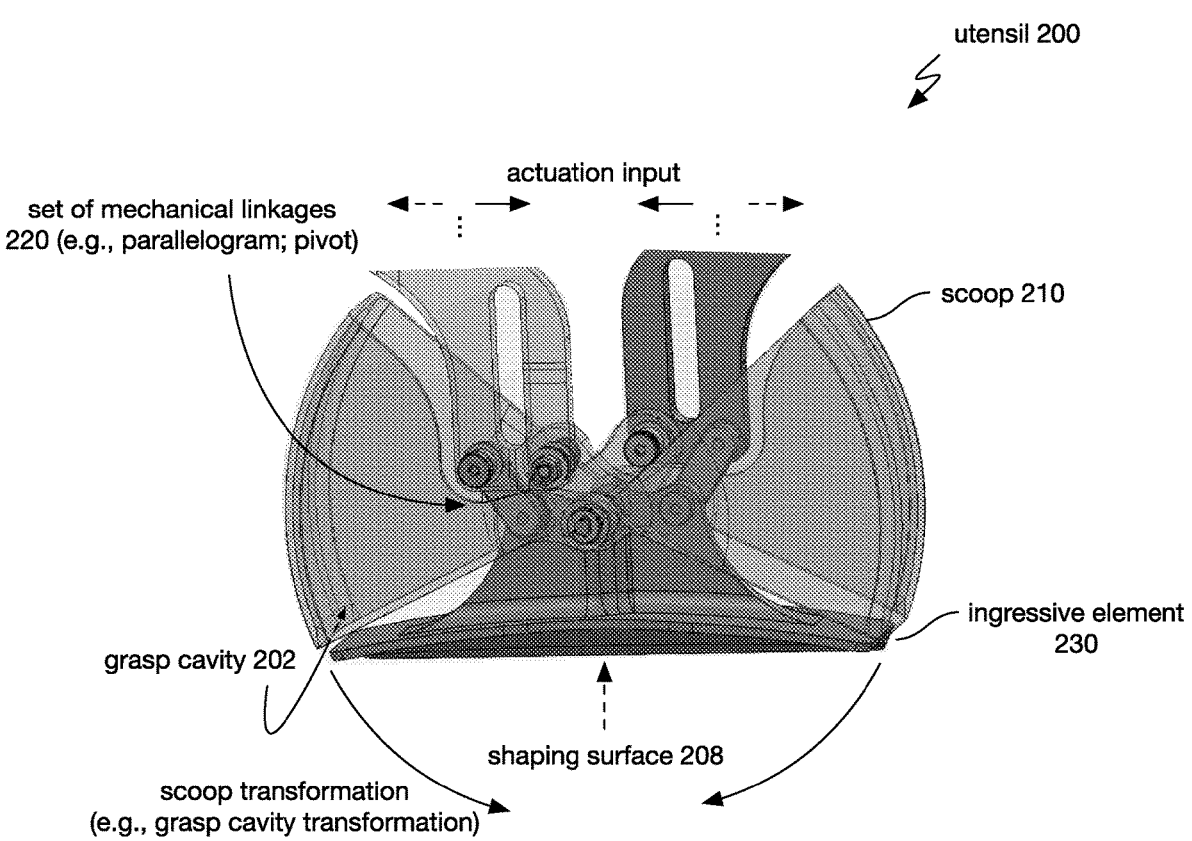
FIG. 5 is an isometric view of a first variant of a utensil.
Figure 19:
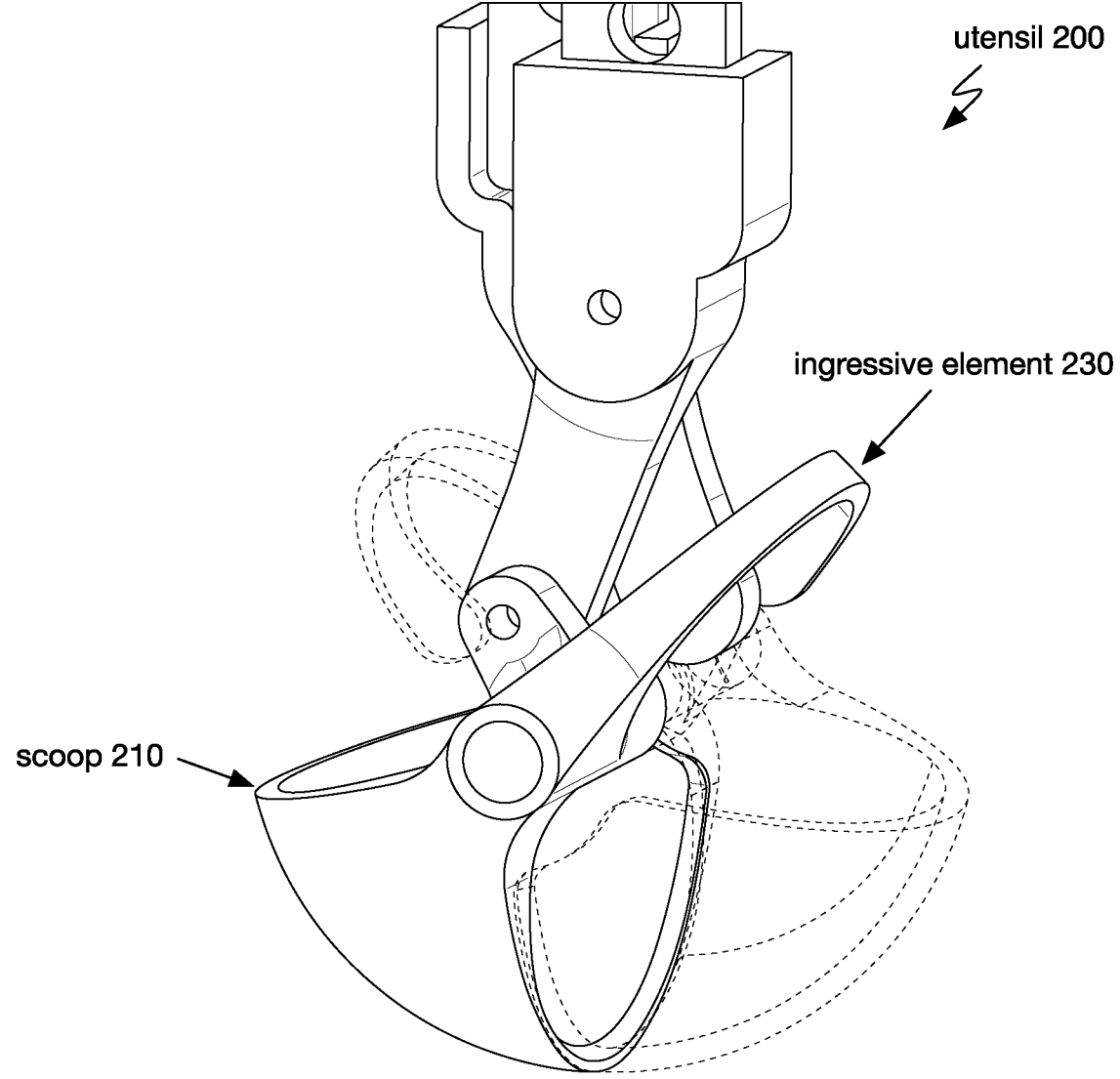
FIG. 19 is a partial 3D representation of a variant of an end effector.

The utensil can include a singular scoop (e.g., an example is shown in FIG. 4) or multiple scoops (e.g., two, three, more than three, etc.). In one set of variants, the utensil can include a pair of scoops, such as may provide clamshell engagement (e.g., substantially symmetric, pairwise symmetry relative to a central plane). The geometry of scoops can be: clamshell-shaped, shaped a bucket of an excavator/digger, prismatic, concave (and/or include convex portions), define a substantially uniform cross section (e.g., relative to an actuation axis) and/or have any other suitable structure or geometry(ies). Likewise, the grasp cavity can be: prismatic (e.g., a hexagonal prism shape in the first configuration), cylindrical (e.g., in a first configuration), semi-cylindrical, partially cylindrical (e.g., an example is shown in FIG. 5), semi-spherical (or partially spherical; an example is shown in FIG. 19), conical, and/or any other suitable geometry(ies).

In one set of variants, each scoop of the plurality is integrated with at least one ingressive element as a unitary body. In an example, the set of scoops include a first scoop integrated with a first set of ingressive elements as a first unitary body, and a second scoop integrated with a second set of ingressive elements as a second unitary body, wherein the first and second unitary bodies are substantially symmetric.

Figure 6:
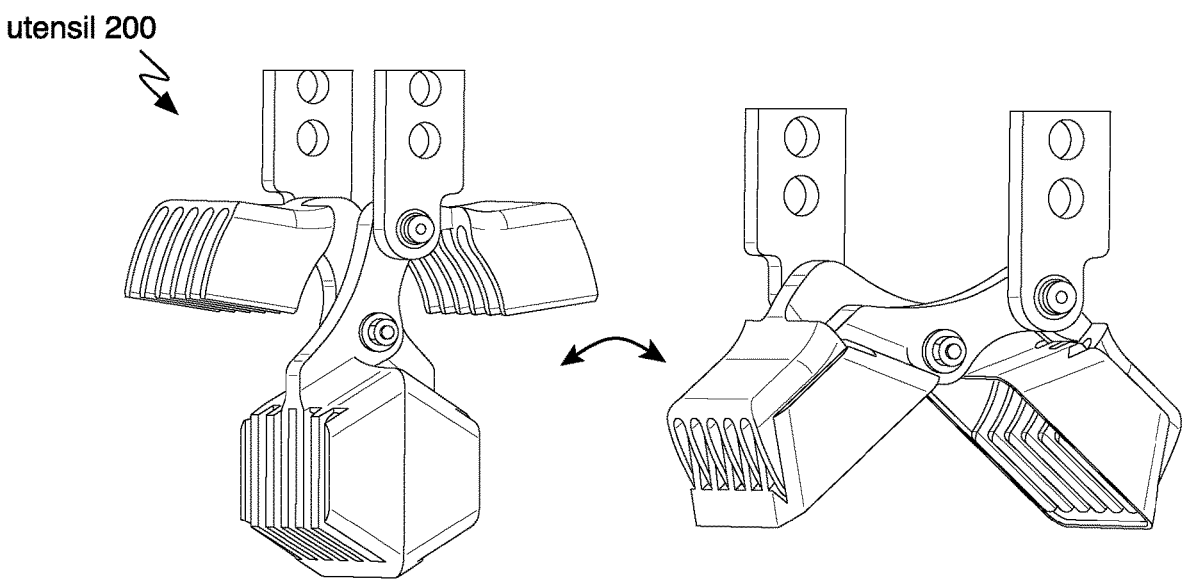
FIG. 6 is a partial 3D representation of a variant of an end effector.

In variants, a distal portion of the scoops (e.g., relative to the actuator; opposite a structurally mounted end of the scoops) can include teeth or other extrusions/projections. Teeth can interdigitate in the second configuration and/or define a cusp-to-fossa relationship, or may be mirrored about a midsagittal plane. Alternatively, the scoops can interface at an edge (e.g., linear, curved, etc.; an example is shown in FIG. 6). Alternatively, the scoop edges (e.g., distal edges) can be separated by a gap in the closed configuration (and/or can be actuated to partially close in some configurations, such as when grasping brittle ingredients). Teeth may function to agitate food particles (e.g., particularly large food particles, frozen food conglomerates, substantially nondeformable food particles, etc.) during actuation/grasping and/or retain food particles (e.g., when the tool does not fully close, such as may occur for non-homogeneous conglomerates and/or frozen particulates), by increasing edge length along a distal-most edge (i.e., greater edge length and surface area for agitating foodstuffs, greater edge length and surface area for retaining foodstuffs; relative to the grasp volume). However, the scoops can alternatively exclude teeth and/or be otherwise configured.

The scoops can be mounted/coupled to: the actuator (e.g., an actuated end of the actuator, a central body of the actuator), a utensil mating connector, and/or the set of mechanical linkages. In variants, the scoop may form a link and/or element of the set of mechanical linkages (e.g., an element of a 3-bar linkage, an element of a 4-bar linkage, for example; a lever arm; etc.) and thus may be integrated with the set of mechanical linkages. Alternatively, the scoop can be coupled to a distal end of a mechanical linkage (e.g., opposite an actuated end) and/or can be separate from the set of mechanical linkages (e.g., an example is shown in FIG. 4). However, the scoops can be otherwise mounted.

In variants, the scoops (and/or the grasp cavity defined thereby) can be statically mounted relative to the body of the actuator or can be actuated based on the actuation input (e.g., via the mechanical linkages). The scoops can retain foodstuff ingredients in a first (e.g., grasping) configuration by: containment/enclosure (e.g., largest orifice of scoops and/or grasp cavity is smaller than an ingredient dimension and/or characteristic length), compression/squeezing (e.g., relative pose maintained based on static friction), adhesion (e.g., sticky and/or deformable materials retained against the grasp surface of the scoops), and/or via any other suitable grasping/retention forces.

Figure 9:
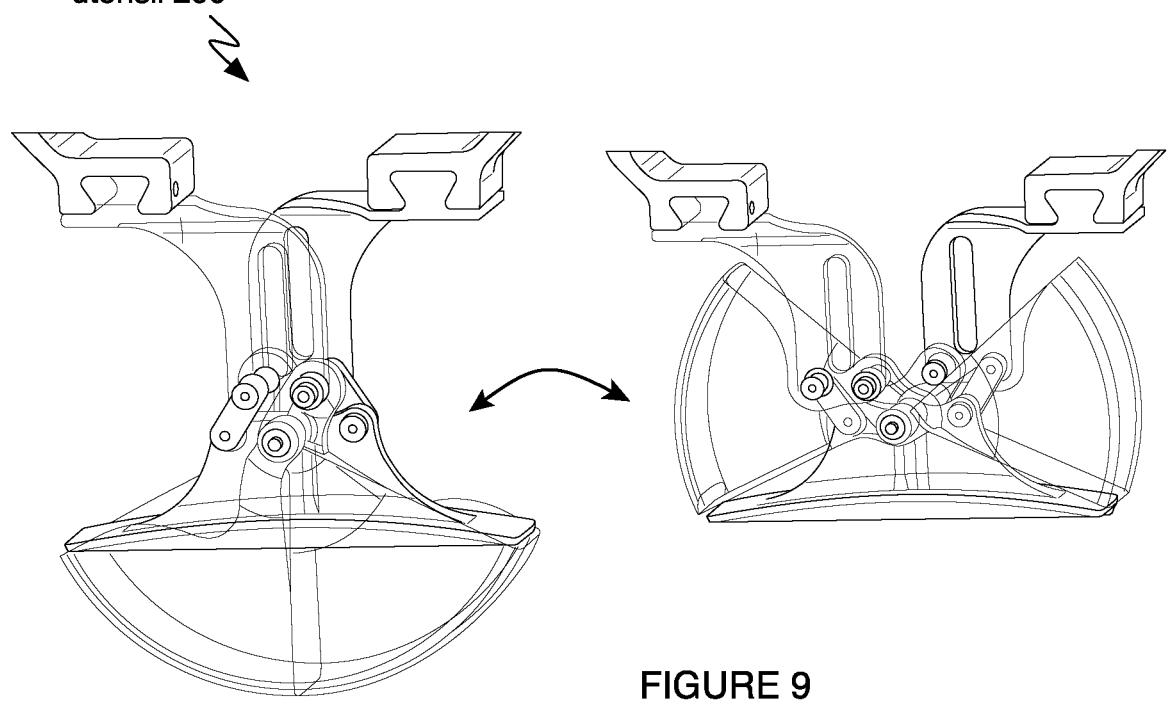
FIG. 9 is a partial 3D representation of a variant of the end effector.

In a first set of variants, the scoop can actuatable/transformable (e.g., based on the actuation input; an example is shown in FIG. 3; a second example is shown in FIG. 5), such as a scoop, claw, and/or finger of a gripper-style utensil. In such variants, scoops can be transformed between the first configuration (e.g., grasp configuration) and a second configuration (e.g., anti-grasp configuration; ingressive configuration; open configuration, etc.) along a trajectory which can include linear transformations, rotational transformations, and/or any suitable transformations in SO(3). For example, in some variants, the scoop(s) can be transformed along a trajectory between the first and second configurations which may be parameterized as a 1-dimensional rotation (e.g., about an axis of rotation), which may minimize a resulting deformation/compression of ingredients (e.g., which may be particularly beneficial when such compressions may degrade ingredients, such as breaking cereal, etc.) for scoops geometries with substantially uniform radial geometries about the axis of rotation (e.g., an example is shown in FIG. 5 and FIG. 9). Alternatively, the transformation can include rotational and linear components (e.g., an example is shown in FIG. 6; motion may be parameterized as a minimum of 2-dimensional components; etc.), and/or can have any other suitable motion.

In a second set of variants, the scoop can be statically mounted relative to the body of the actuator (e.g., an example of which is shown in FIG. 4). In such cases, the actuator itself may be transformed (e.g., by a robotic arm and/or robotic assembly system), cooperatively transforming the actuator, scoop(s), and grasp cavity while in a first configuration. For example, the scoop may be pressed into a bin of ingredients while in the first configuration (e.g., where a transition to the second configuration forcibly ejects foodstuff from the grasp cavity).

Figures 22A, 22B:
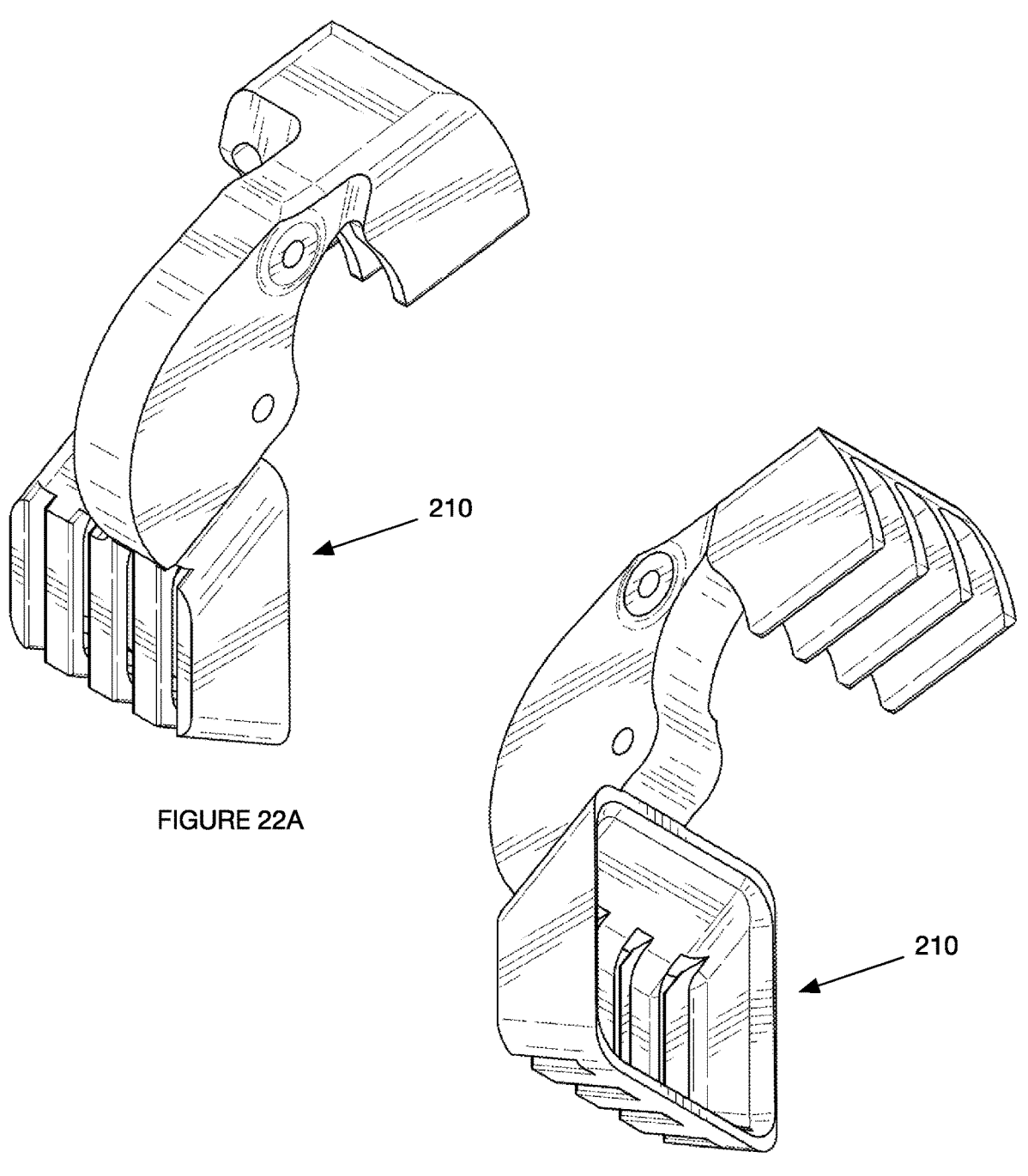
FIG. 22A is an isometric view, from the front top left, of a first variant of a scoop, integrated with a set of ingressive elements.
FIG. 22B is an isometric view, from the back bottom right, of the first variant of a scoop, integrated with a set of ingressive elements.
Figures 22G, 22H:
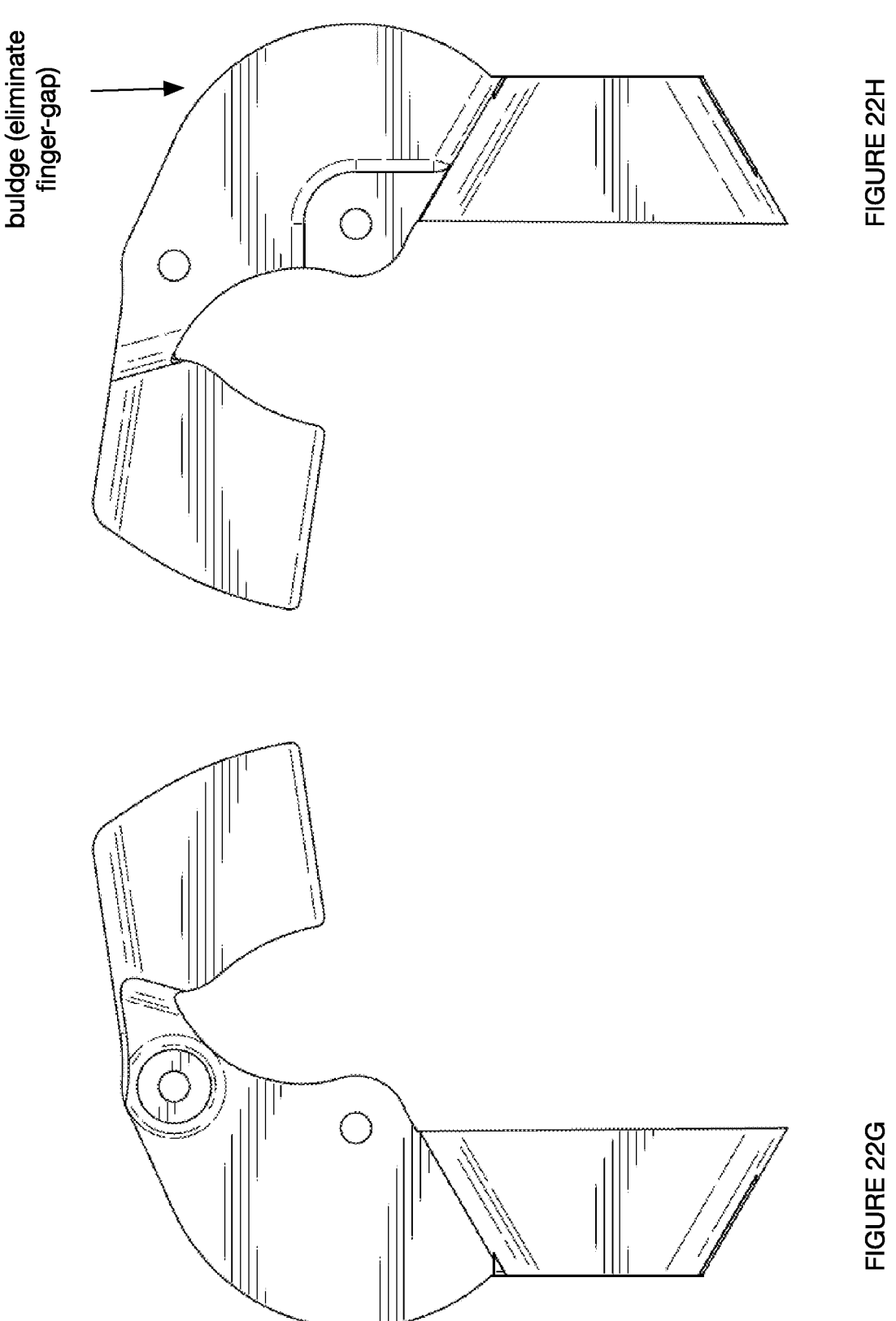
FIG. 22G is an elevation view from the back of the first variant of a scoop, integrated with a set of ingressive elements.
FIG. 22H is an elevation view from the front of the first variant of a scoop, integrated with a set of ingressive elements.

The scoops can include and/or define a set of orifices (a.k.a., apertures) which fluidly connect an interior volume and/or grasp surface of the grasp cavity to a fluid exterior (e.g., ambient air surrounding the end effector) and/or allow ingress of the set of ingressive elements into the grasp cavity in the anti-grasp configuration. Orifices can include holes (e.g., through-holes), slots, material cutouts, material voids, and/or any other suitable orifices/apertures with any suitable material cross-sectional geometries. For example, the apertures can have round/circular cross sections, rectangular cross-sections (e.g., for a projection of the aperture in a particular plane, an example is shown in FIG. 22C and FIG. 22D), open cross sections (where the aperture extends up to the distal end of the scoop, for example), and/or any other suitable cross-sectional geometries. In variants, a plurality of orifices/apertures can be arrayed (e.g., linear array, 2D array), patterned, and/or otherwise distributed. Alternatively, the orifices can be unitary (e.g., single orifice per scoop and/or per end effector), and/or otherwise arranged.

In variants, the grasp volume is preferably defined as the interior volume bounded by the grasp cavity(ies) in the grasp configuration, which can be deterministic for the geometry of the tool and/or can be deterministically controlled to pick a predefined volume/amount of an ingredient(s) based on the geometry. Additionally or alternatively, the system can be dynamically/adaptively controlled according to software defined grasp parameters to selectively grasp a variable amount of foodstuff grasped by the utensil and/or scoops thereof, such as by varying actuation parameters of the actuator 110 (e.g., actuation stroke force/distance, pneumatic actuation pressure, etc.), controlling the robotic actuation of the system (e.g., based on the orientation/trajectory of the robot arm, such as by jiggling or shaking the utensil using during a grasp; based on a grasp depth below a surface of the foodstuff; based on a lateral offset relative to a foodstuff target; based on a grasp offset from a surface of the foodstuff; etc.), utilizing perception/sensory feedback control (e.g., for non-volumetric grasping, such as mass-based grasping), and/or the amount of grasped foodstuff can be otherwise controlled/adjusted during grasping and/or insertion. For example, during grasping (e.g., which may shift/ agitate ingredients to facilitate grasping or grasping consistency) or insertion (e.g., which may aid in evacuation of ingredients from the grasp cavity), the actuator can be robotically manipulated to shake/jiggle the utensil and/or scoops with various amplitudes, displacements, and/or orientations (e.g., lateral displacement amplitude of less than 1 mm, 1 mm, 2 mm, 3 mm, 4 mm, 5 mm, 10 mm, greater than 10 mm, any open or closed range bounded by the aforementioned values, and/or any other suitable lateral displacement; robotic wrist rotation of: less than 5 degrees, 5 degrees, 10 degrees, 20 degrees, 30 degrees, 45 degrees, greater than 45 degrees, and/or any other suitable rotational displacement; jiggle/shake frequency of less than 0.3 Hz, 0.3 Hz, 0.5 Hz, 0.75 Hz, 1 Hz, 2 Hz, 4 Hz, 10 Hz, greater than 10 Hz, and/or any other suitable frequency; shaking/jiggling with any suitable motion characteristics, etc.).

However, the scoop can be otherwise transformable; and/or the utensil can include any other suitable set of scoops.

The set of ingressive elements 220 function to forcibly evacuate ingredients from the grasp cavity (e.g., clearing out ingredients adhering to the utensil) and/or occupy a portion of the grasp cavity (e.g., reducing the effective volume). The set of ingressive elements preferably transforms relative to the grasp cavity (and/or scoops bounding the grasp cavity) between the first and second configurations such that the ingressive element occupies a portion of the interior volume of the grasp cavity in the second (e.g., anti-grasp) configuration. Alternatively, the ingressive element can ingress into the cavity in the first configuration, between the first and second configurations, and/or in any other scoop configuration. The set of ingressive elements are preferably solid, but can alternatively be fluid (e.g., pressurized gas or liquid) and/or have any other state of matter. The set of ingressive elements can be substantially static (e.g., static, static relative to the actuator, displacement of less than 10% of a grasp cavity displacement, etc.; an example is shown in FIG. 5) or may be transformable between the first and second configurations (e.g., examples are shown in FIGS. 3 and 4). For example, the set of ingressive elements can be coupled to the same actuation input as a scoop, a different actuation input than the scoop, may be coupled to the scoop (and/or integrated into a singular body; an example is shown in FIG. 3). Accordingly, the ingressive elements may transform through the grasp cavity by transforming either and/or both of the scoop(s) and the ingressive element(s).

In the second configuration (and/or first configuration and all liminal states therebetween) set of ingressive elements are preferably offset from the body of the scoops and/or orifices thereof by a clearance distance (e.g., less than 0.25 millimeters, 0.25 millimeters, 0.5 millimeters, 1 millimeter, greater than 1 millimeters, any open or closed range bounded by the aforementioned values, etc.), which can minimize cyclic wear (e.g., for many thousands of cycles; occurring as a result of material contact under one or more instantaneous load cases and/or liminal states between the first and second configurations) during repeated and/or continuous operation. However, the ingressive element can alternatively establish contact with the body of the scoop(s) grasp surface and/or scrape against the scoops (e.g., where the material of the ingressive elements may be rubberized or deformable), or can be otherwise suitably configured.

The ingressive elements can enter the grasp cavity through orifices in the scoop(s), such as through a convex/ exterior side of a scoop (e.g., opposite grasping surface), through a thickness of the scoop, parallel to a central axis of a scoop (e.g., where the radial cross section of the scoop is substantially uniform along a length of the axis), and/or at any other suitable ends. The utensil can include a single ingressive element (e.g., an example is shown in FIG. 4) or multiple ingressive elements; ingressive elements can have one-to-one correspondence with the scoops (e.g., an example is shown in FIG. 3), the utensil can include multiple ingressive elements per scoop (e.g., one-to-one correspondence per orifice in the scoops, etc.), and/or a single ingressive element may correspond to multiple scoops (e.g., an example is shown in FIG. 5).

The ingressive elements can be in the form of fins, appendages, and/or protrusions, which extend from one or more material bodies of the end effector system. For example, ingressive elements may have a structure of fin array of a heat sink (e.g., with a geometry which may increases the convective/radiative heat transfer of the body, and/or which may have minimal to no impact on the system thermals) or resemble a heat sink fin array (e.g., while being constructed from a polymer). Additionally or alternatively, the ingressive elements can include a mechanical fin(s) with a cross-sectional geometry (e.g., along a primary axis of the fin, swept along a linear/arcuate path, etc.) which is substantially geometrically similar (e.g., scaled down from, offset by the clearance distance from) a cross-sectional geometry of a respective orifice(s), which the ingressive element may penetrate in one or more configurations. As a first example, fins may be arcuate, having a first and second radius about radial section of a hinge/revolute axis of the set of linkages based on proximal and distal end positions of apertures, such that the fins are configured pass through the orifices based on a relative rotation between the fins and scoops rotate about the revolute axis.

In one set of variants, the ingressive elements and the interior volume of the grasp cavities each define a respective swept volume based on a transformation of the end effector system between a grasp configuration and an anti-grasp configuration, wherein the respective swept volumes of the ingressive elements and the grasp cavities intersect.

In one set of variants, the ingressive elements occupy and/or intersect (in the anti-grasp configuration) a swept volume defined by a transformation of the scoops between a grasp configuration and an anti-grasp configuration.

In one set of variants, the ingressive elements transform along a swept volume (e.g., union of volumetric regions occupied by the ingressive elements at each liminal configuration) between the grasp and anti-grasp configurations, wherein the swept volume intersects a volume of the grasp cavity in the anti-grasp configuration.

In one set of variants, the interior of the grasp cavity comprises a grasp surface 204 which is configured to contact ingredients within the grasp cavity, wherein the grasp surface defines a reference surface, defining a maximal extent of the ingredients in the grasp configuration (e.g., where ingredients do not pass through the orifices; by substantially closing out orifices relative to the grasp surface, such as by fitting a planar/arcuate surface to the orifice based on the scoop geometry, etc.; wherein the reference surface is a closed 3D solid), wherein the ingressive elements ingress the reference surface in the anti-grasp configuration.

In one set of variants, each ingressive element defines an ingressive surface 206 (e.g., at a distal end of the fin/appendage) which is configured to contact foodstuff ingredients in one or more configurations of the system, wherein the ingressive surfaces ingress the grasp cavity in the anti-grasp configuration.

In one set of variants, each ingressive element of the set comprises a fin with a cross-sectional geometry which is strictly smaller than the geometry of a respective aperture (e.g., wherein the fin is configured to ingress the respective aperture in the anti-grasp configuration).

Ingressive elements can ingress a portion of the scoop and/or grasp volume (e.g., a first example is shown in FIG.

Figure 7:
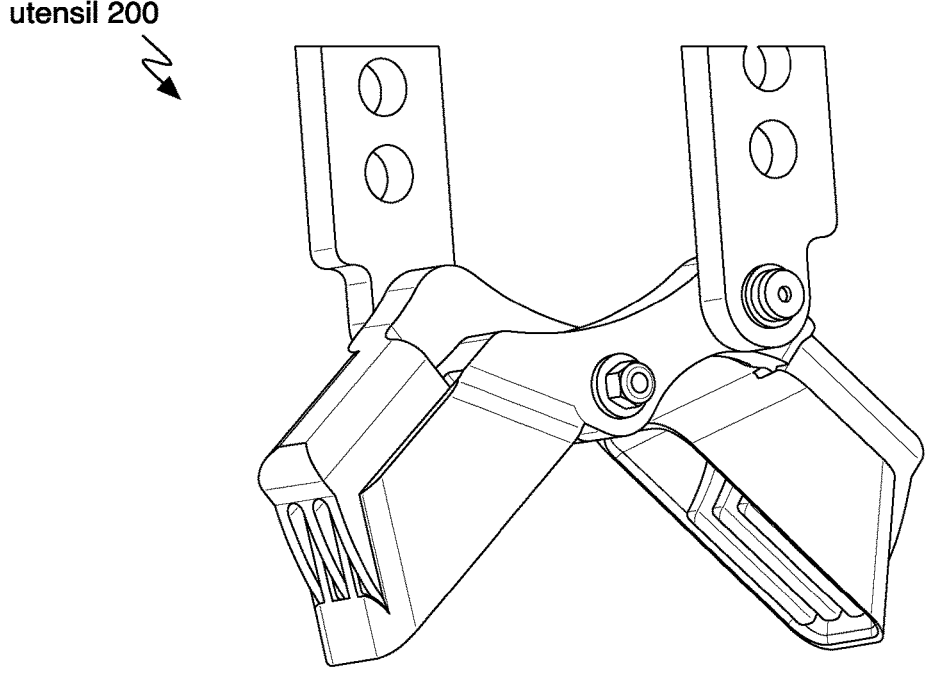
FIG. 7 is a partial 3D representation of a variant of the end effector.
Figure 8:
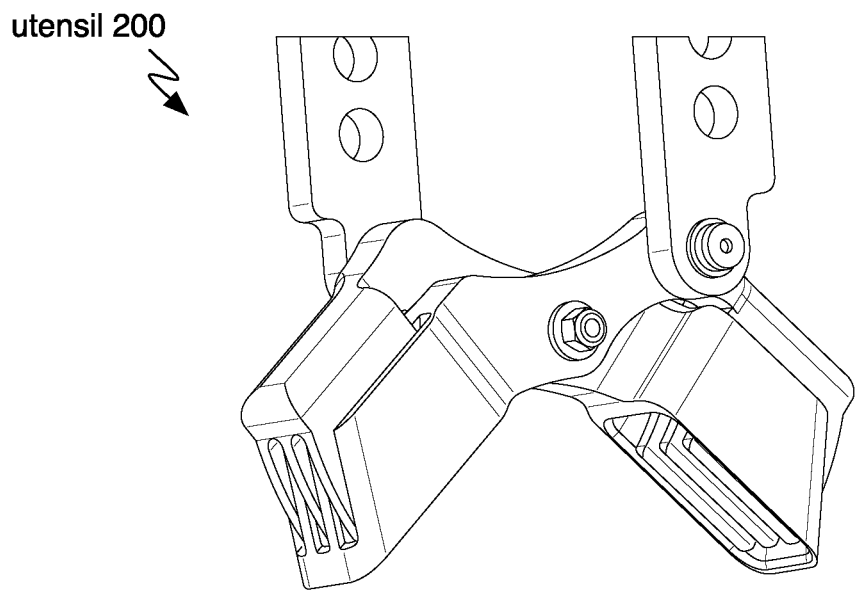
FIG. 8 is a partial 3D representation of a variant of the end effector.

6, a second example is shown in FIG. 7; relative to a side view cross-section) or an entirety of the scoop interior (e.g., with less than a predetermined clearance of less than a predetermined dimension, such as a minimum foodstuff particulate dimension, to all portions of the scoop; an example is shown in FIG. 8; beyond cavity, examples of which are shown in FIGS. 26A-B and 27A-B). For example, the scoops can include a volumetric region which is not penetrated by the ingressive elements (e.g., non-ingress region of the interior), instead relying on gravity and/or other cleared ingredients to evacuate foodstuffs (e.g., where the ingressive elements clear foodstuff from a portion of grasp surfaces which have surface normal vectors oriented above horizontal and/or define an angle less than a predetermined threshold relative to horizontal, such as less than 10, 20, 30, 45, 70 degrees below horizontal, to which foodstuff particulates may more readily adhere). Conversely, in a first example, ingress element dimensions and/or orifice dimensions can be increased so that the ingressive elements ingress a proximal portion of the grasp cavity (e.g., upper portion, portion adjacent to a hinge, etc.). However, the scoops and/or ingressive elements can be otherwise shaped to provide any suitable partial or complete ingress of the ingressive elements in the anti-grasp configuration.

However, the utensil can include any other suitable set of scoops.

The set of mechanical linkages 230 to transform the actuation input 112 from the actuator (e.g., as transferred through the utensil mating connector) into a relative transformation of the grasp cavity. Additionally or alternatively, the set of mechanical linkages functions to transition the utensil between a first configuration (e.g., grasp configuration) and a second configuration (e.g., anti-grasp configuration; ingressive configuration; open configuration, etc.).

The mechanical linkages preferably include revolute (a.k.a. hinged) joints, but can additionally or alternatively include prismatic (a.k.a. sliding) joints, spherical joints, cylindrical joints, universal joints, planar joints, and/or any other suitable joints. The mechanical linkages can be coupled and/or formed into a unitary kinematic chain, multiple kinematic chains, open kinematic chains, closed kinematic chains, and/or arranged in any other suitable configuration(s). The set of mechanical linkages can include one or more: lever mechanism (e.g., hinged linkage), scissor linkage, 3-bar linkage, 4-bar linkage (e.g., parallelogram linkage), 5-bar linkage, 6-bar linkage, planar linkage, spatial linkage, Scott Russell linkage, crank-rocker linkage, slider-crank, drag-link mechanism, and/or any other suitable linkage(s). The set(s) of mechanical linkages is preferably substantially symmetric (e.g., in a projected plane, mirror symmetry, etc.), but can alternatively be asymmetric. In a first example, a single linkage can be symmetrically connected to opposing scoops (e.g., hinged at a central pivot) and generate symmetric transformations (e.g., an example is shown in FIG. 6). In a second example, a pair of joints constraining a distal element of a scissor linkage can be a revolute joint and a pin-in-slot joint (e.g., which may be kinematically modeled as a revolute joint in combination with a sliding joint), respectively. However, any suitable types and/or arrangements of mechanical linkages can be used. However, the utensil can include any other suitable set of mechanical linkages.

In one set of variants, the mechanical linkages can define a first 2D coupler curve associated with a point on the body of the ingressive elements and a second 2D coupler curve associated with a point on the body of a scoop, wherein the first and second coupler curves intersect in a projected 2D plane (e.g., side view plane; an example is illustrated in FIG. 25E).

The mechanical linkages can be actuated linearly (e.g., extending one element/bar of the linkage, an example is shown in FIGS. 25A-25E), rotationally, and/or otherwise actuated via any suitable actuation input[s] 112).

In variants, revolute joints between mechanical linkages can include any suitable hardware/fasteners. In a first example, revolute joints can include shoulder screws or other threaded fasteners (e.g., lock nuts/washers; examples are shown in FIGS. 3-9; etc.). In a second example, revolute joints can include grooved pins with retention clips (e.g., c-clips) and wave lock washers (e.g., examples are shown in FIGS. 20A-20B, and FIGS. 21A-21B).

The utensil can optionally include a shaping surface 208 which functions to shape an aggregate pose of ingredients upon placement (e.g., when depressed against the upper surface of the ingredients) or picking. The shaping surface can be integrated into or be the same as an ingressive element or be a separate body. The shaping surface can be flat/planar, concave, convex, saddle-shaped (e.g., form of an anticlinal fold), and/or have any other suitable geometry. In a first example, the shaping surface can be arranged on a (downward facing) surface of the ingressive element(s), opposite the actuator. In a second example, the shaping surface can be a proximal portion of the grasp surface (e.g., closest to the actuator). In variants, the shaping surface is may be configured to compress and/or aggregate ingredients based on a transition to an anti-grasp configuration, or based on a transformation of a robotic assembly system (e.g., transforming the entire end effector system towards the ingredients in an anti-grasp configuration). However, the utensil can alternatively exclude a shaping surface, and/or can be otherwise suitably configured.

In variants, the body geometry(ies) of the extension elements, scoops, mechanical linkage elements, ingressive elements, and/or any other suitable utensil elements can be shaped to reduce/eliminate pinch points. For example, various adjacent moving components can include material close-outs which provide less than a threshold finger clearance (e.g., less than 6 millimeter spacing) between adjacent bodies which transform relative to one another. For instance, in variants where each scoop of the is integrated with a linkage element and at least one ingressive element as a unitary body (e.g., an example is shown in FIGS. 22A-22G), a central portion of the unitary body can include a uniform radius (and thickness) about an axis of the revolute joint. Accordingly, when two such bodies transform adjacent to one another (rotating about the revolute joint), the resulting transformation does not result in a gap larger than 6 millimeters (e.g., examples are shown in FIGS. 18A-18B and FIGS. 24A-24B). Additionally, in variants which include extension elements, the extension elements can be angled between a base and a distal end (e.g., rather than L-shaped), which may result in a larger clearance (e.g., for a hand/wrist) and a resulting V-shape between a pair of extension elements (e.g., which may push any foreign body caught in between them, such as a hand/wrist, upward during an actuation stroke, as opposed to instantaneously shearing the foreign body; an example is shown in FIG. 18B). However, any other elements of the system can include any other suitable bulges/protuberances which may close out finger gaps and/or otherwise reduce/eliminate pinch points. Additionally or alternatively, the utensil can optionally include or be used in conjunction with a sheath or other surrounding enclosure, which substantially encloses the utensil and may reduce/ eliminate opportunities for finger/hand ingress into the set of mechanical linkages and/or base end of the scoops (e.g., which may further reduce/eliminate pinch points).

However, the end effector system can include any other suitable utensil(s).

4. VARIANTS

In a first variant (e.g., examples are shown in FIGS. 6-8) a utensil can be configured to self-clean during a placement/ ejection stroke. In such variants, a food ingredient manipulation utensil can be configured to work with multiple ingredient types (e.g., frozen, freshly cooked, etc.). FIG. 6 illustrates that in the closed position, food ingredients can be fully enclosed within the two opposing scoops, capturing them volumetrically; and, while in the open position, long projections can enter the scoops to facilitate the ejection of materials. Portion sizes can be carefully controlled by changing the dimensions of the utensil, such as by altering the width—an example of which is shown in FIG. 7. Additionally or alternatively, the shape of the walls can be modified, an example of which is shown in FIG. 8, which may optimize the internal volume coverage by the long projections (e.g., where the projections may span substantially a full dimension of interior cavity, such as a height). The long projections can increase the versatility of the utensil, and may allow it to function (e.g., for repeated cycles) with ingredients that might otherwise stick to the utensil surface and hinder (subsequent) picking/placement operations, such as wet ingredients or frozen ingredients that are starting to melt.

In a second variant, an example of which is shown in FIG. 9, a utensil can convert an input actuation stroke into a scooping motion; specifically, it is a scooping utensil with concentric rotation, and a stationary center of rotation. This utensil retains the previous concept of fully encapsulating the ingredients picked to achieve precise volumetric picks (e.g., within 1 mL, within 5 mL, within 10 mL, etc.). Additionally, because of the circular scooping motion with the center of the circle remaining stationary, there can be minimal (e.g., exactly zero) compression of the food ingredients outside the utensil (i.e. the remaining ingredients in the container below the volume that has been picked). This can be advantageous for delicate, soft, or easily deformable/ compressible ingredients. In some examples, the utensil can include a component that remains stationary with respect to the entire motion of the scoops. In such instances, the stationary component can be located inside the scoops and aids the releasing of sticky ingredients from the inside cavity of the scoops as the utensil opens. Because the scooping motion can occur inside the actuator and utensil (vs using another method like a robotic arm), cycle time is preserved while achieving a scooping motion.

Figures 12A, 12B, 13:
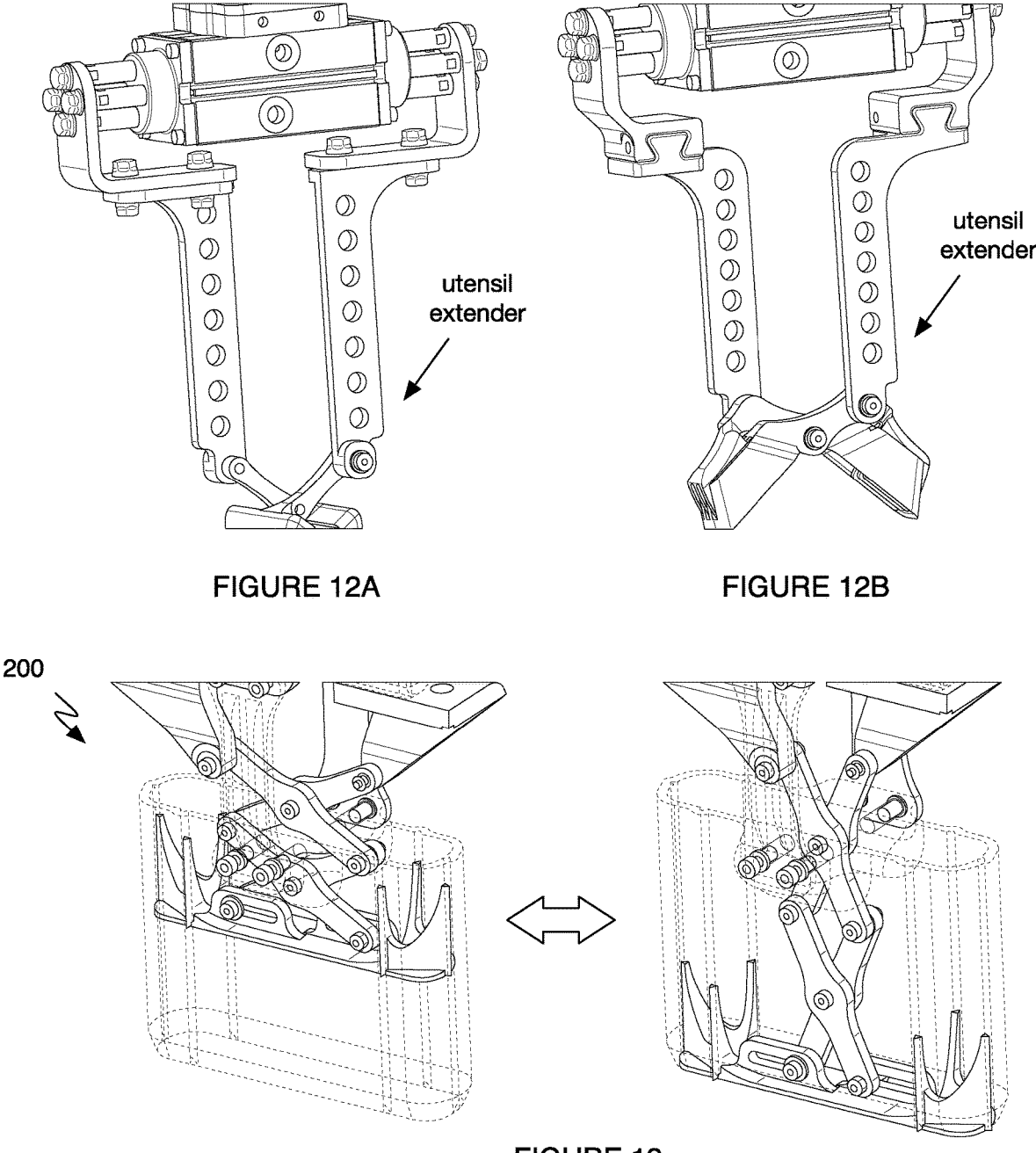
FIG. 12A-B illustrates a first and second example of extenders in a first and second variant of the end effector system, respectively.
FIG. 13 is a partial 3D representation of a variant of the end effector.

Utensils can optionally include or be used with utensil extenders (e.g., examples are shown in FIGS. 12A and 12B) which can function to physically distance the utensil from the end effector body, which may provide advantages of i) keeping the end effector farther away from the food ingredients being manipulated, and ii) dissociating the physical footprint of the end effector from the utensil, allowing food manipulation of the utensil to continue unhampered when reaching into deep containers and/or food pans. The utensil extenders can optionally include several features to reduce effective weight, and also different attachment mechanisms to the jaws of the end effectors. Extenders can allow a utensil and/or actuators to accesses a larger pick area within a food container (e.g., because of the enlarged size of the actuator necessary to achieve sufficient force and stroke length), which can increase the versatility and/or efficacy of various tools.

Figure 14:
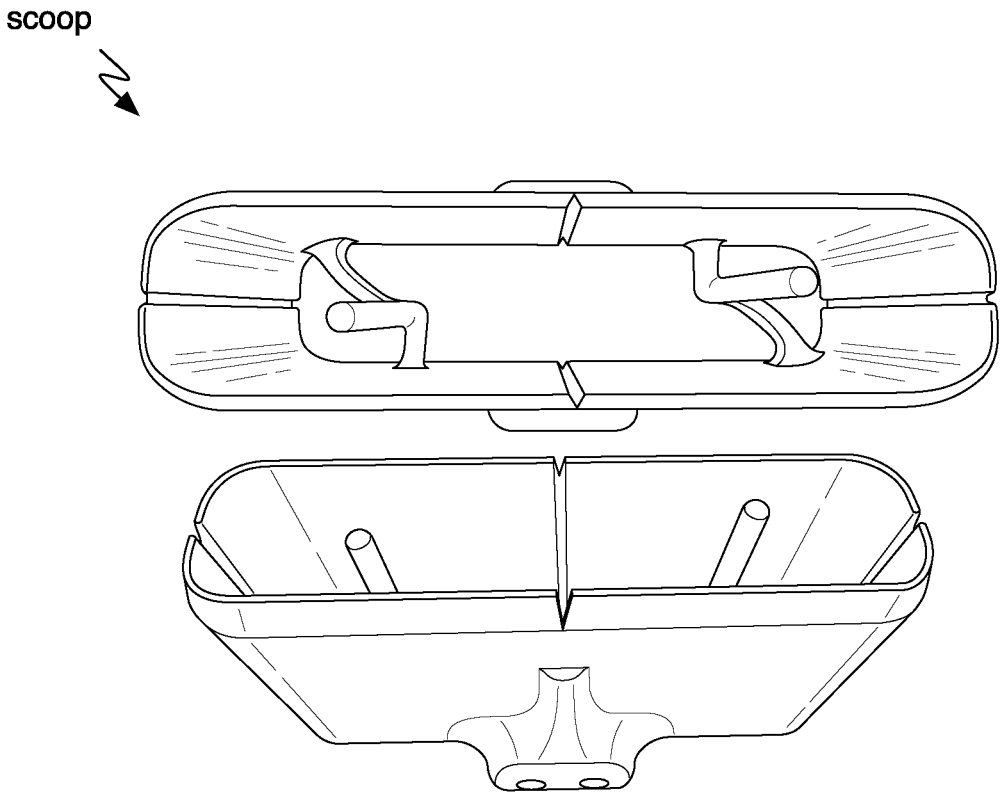
FIG. 14 includes images of a component in an example of the variant of end effector system shown in FIG. 13.

In variants, utensils can be configured to pick sticky and/or malleable ingredients (e.g., an example is shown in FIGS. 13-14). In variants, a utensil can be pressed into a container of sticky food ingredients, for example rice or ice cream, by a robotic system, causing the food ingredients to be retained within the outer cavity of the utensil. When the robotic system brings the utensil to the assigned location for food deposition, the end effector can then actuate the mechanisms within the utensil, which convert two parallel reciprocating linear motions into the downward motion of an ejection surface, as depicted in FIG. 13. The outer cavity of the utensil can include various features, such as central rods (e.g., an example is shown in FIG. 14) which can aid in the retention of ingredients by providing additional surfaces for the ingredients to adhere/stick to.

Embodiments of the system can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A robotic end effector system for aggregate manipulation of foodstuff, comprising:
   an actuator configured to mount to a distal end of a robotic arm; and
   a foodstuff utensil mounted to the actuator, comprising:
      a plurality of scoops, each comprising a respective grasp cavity and a defining set of apertures;
      a set of mechanical linkages coupling the plurality of scoops to the actuator and configured to transition the plurality of scoops between a grasp configuration and an anti-grasp configuration based on a mechanical actuation input from the actuator, wherein, in the grasp configuration, the plurality of scoops cooperatively defines a grasp volume within an interior of the respective grasp cavities of the plurality of scoops; and
      a set of ingressive elements, each ingressive element of the set aligned with a respective aperture of the set of apertures, wherein, in the grasp configuration, each ingressive element is outside of the grasp volume, wherein, in the anti-grasp configuration, each of the ingressive elements ingress the interior of the respective grasp cavity through the respective aperture of the set of apertures.

2. The robotic end effector system of claim 1, wherein the foodstuff utensil is mounted to the actuator with a utensil mating connector comprising a tapered dovetail joint.

3. The robotic end effector system of claim 1, wherein a height of the foodstuff utensil in the grasp configuration exceeds six inches.

4. The robotic end effector system of claim 3, wherein the mechanical actuation input comprises an actuation stroke of the actuator defining a stroke length, wherein the linkage element of the set of mechanical linkages comprises a length dimension which is at least twice as large as the stroke length of the actuator.

5. The robotic end effector system of claim 3, wherein the actuator and the utensil mating connector cooperatively define a first footprint, wherein the foodstuff utensil defines a second footprint, wherein a vertical projection of the first footprint extends at least partially beyond the second footprint.

6. The robotic end effector system of claim 1, wherein the foodstuff utensil is passively actuatable via the set of mechanical linkages.

7. The robotic end effector system of claim 1, wherein a color range of each scoop of the plurality and each ingressive element of the set satisfies a minimum color distance from an aggregate foodstuff ingredient.

8. The robotic end effector system of claim 7, wherein at least one of the plurality of scoops is blue.

9. The robotic end effector system of claim 1, wherein each scoop of the plurality is integrated with a linkage element and at least one ingressive element into a unitary body.

10. The robotic end effector system of claim 9, wherein the set of mechanical linkages comprises a revolute joint connecting the unitary bodies of each scoop of the plurality of scoops.

11. The robotic end effector system of claim 10, wherein a central portion of the unitary body defines a uniform thickness and radius about an axis of the revolute joint.

12. The robotic end effector system of claim 9, wherein each ingressive element of the set comprises a fin with a cross-sectional geometry which is strictly smaller than the respective aperture geometry.

13. The robotic end effector system of claim 9, wherein the plurality of scoops comprises a first scoop integrated with a first ingressive element into a first unitary body and a second scoop integrated with a second ingressive element within a second unitary body, wherein the first and second ingressive elements are aligned with apertures of the second and first scoops, respectively, wherein, in the anti-grasp configuration, the first and second ingressive elements occupy the interior of the respective grasp cavities of the second and first scoops.

14. A foodstuff utensil configured to mount to an actuator of a robot for aggregate manipulation of foodstuff, the foodstuff utensil comprising:
   a set of utensil mating connectors;
   a set of scoops, each comprising a grasp cavity and defining a respective set of apertures;
   a set of ingressive elements, each associated with a scoop from the set of scoops;
   a set of mechanical linkages coupling the set of scoops to the set of utensil mating connectors, wherein the set of mechanical linkages is configured to transform the set of scoops between a first and second configuration based on an actuation of the set of utensil mating connectors, wherein, in the first configuration, each ingressive element is outside of an interior grasp volume of each grasp cavity, wherein, in the second configuration, each of the ingressive elements ingress the respective scoop of the set of scoops through a respective aperture of the respective set of apertures of the respective scoop, wherein each ingressive element is aligned with the respective aperture.

15. The foodstuff utensil of claim 14, wherein the set of mechanical linkages comprises a triangle linkage, five-bar linkage, or a scissor linkage.

16. The foodstuff utensil of claim 14, wherein the ingressive elements are configured to evacuate foodstuff from the grasp cavity of the respective scoop based on a transition from the first configuration to the second configuration.

17. The foodstuff utensil of claim 14, wherein at least one scoop of the plurality is integrated with an ingressive element of the set as a unitary body.

18. The foodstuff utensil of claim 17, wherein the set of scoops comprises a first scoop integrated with a first set of ingressive elements as a first unitary body, and a second scoop integrated with a second set of ingressive elements as a second unitary body, wherein the first and second unitary bodies are substantially symmetric.

19. The foodstuff utensil of claim 18, wherein the set of mechanical linkages comprises a revolute joint connecting the first and second unitary bodies.

20. The foodstuff utensil of claim 14, wherein the set of a set of utensil mating connectors comprises a dovetail slot or a dovetail extrusion.

\* \* \* \* \*